United States Patent
Li et al.

(10) Patent No.: US 10,904,928 B2
(45) Date of Patent: Jan. 26, 2021

(54) DATA LINK ESTABLISHMENT METHOD AND APPARATUS

(71) Applicant: HUAWEI TECHNOLOGIES CO., LTD., Shenzhen (CN)

(72) Inventors: Xiaoxian Li, Shenzhen (CN); Ping Fang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/775,400

(22) PCT Filed: Nov. 7, 2016

(86) PCT No.: PCT/CN2016/104949
§ 371 (c)(1),
(2) Date: May 11, 2018

(87) PCT Pub. No.: WO2017/080426
PCT Pub. Date: May 18, 2017

(65) Prior Publication Data
US 2018/0332631 A1    Nov. 15, 2018

(30) Foreign Application Priority Data

Nov. 12, 2015 (CN) .......................... 2015 1 0771716

(51) Int. Cl.
*H04W 76/20* (2018.01)
*H04W 76/10* (2018.01)
(Continued)

(52) U.S. Cl.
CPC ........... *H04W 76/10* (2018.02); *H04W 72/04* (2013.01); *H04W 76/14* (2018.02); *H04W 84/18* (2013.01); *H04W 88/04* (2013.01)

(58) Field of Classification Search
CPC ..... H04W 72/04; H04W 76/10; H04W 76/14; H04W 84/18; H04W 88/04
See application file for complete search history.

(56) References Cited

U.S. PATENT DOCUMENTS

| | | | |
|---|---|---|---|
| 2006/0171403 A1 | 8/2006 | Kim et al. | |
| 2009/0221288 A1* | 9/2009 | Zhang | H04B 7/2606 455/434 |

(Continued)

FOREIGN PATENT DOCUMENTS

| | | |
|---|---|---|
| CN | 103595750 A | 2/2014 |
| CN | 104066206 A | 9/2014 |

(Continued)

OTHER PUBLICATIONS

3GPP TR 23.703 V12.0.0 (Feb. 2014),3rd Generation Partnership Project;Technical Specification Group Services and System Aspects;Study on architecture enhancements to support Proximity-based Services (ProSe)(Release 12),dated Feb. 2014,total 324 pages.

(Continued)

*Primary Examiner* — Mansour Oveissi
(74) *Attorney, Agent, or Firm* — Kilpatrick Townsend & Stockton LLP

(57) ABSTRACT

The present invention discloses a data link establishment method and an apparatus. In the solution, a second NAN device sends a relay request message to a first NAN device, so as to trigger the first NAN device to establish a first NDL with the second NAN device and establish a second NDL with a third NAN device. In this way, the second NAN device successfully establishes a connection to the third NAN device. This resolves a prior-art disadvantage of failing to establish an NDL.

20 Claims, 14 Drawing Sheets

(51) Int. Cl.
*H04W 76/14* (2018.01)
*H04W 72/04* (2009.01)
*H04W 84/18* (2009.01)
*H04W 88/04* (2009.01)

(56) References Cited

U.S. PATENT DOCUMENTS

| | | | |
|---|---|---|---|
| 2014/0044036 A1 | 2/2014 | Kim et al. | |
| 2014/0056282 A1* | 2/2014 | Sun | H04W 52/143 370/330 |
| 2016/0057796 A1* | 2/2016 | Kim | H04W 76/14 370/338 |
| 2016/0073288 A1* | 3/2016 | Patil | H04W 74/08 370/230 |
| 2016/0073330 A1* | 3/2016 | Patil | H04W 88/04 709/220 |
| 2016/0150459 A1* | 5/2016 | Patil | H04L 45/72 370/328 |

FOREIGN PATENT DOCUMENTS

| | | |
|---|---|---|
| CN | 104144465 A | 11/2014 |
| CN | 104378800 A | 2/2015 |
| CN | 104396298 A | 3/2015 |
| CN | 104469695 A | 3/2015 |
| CN | 104703224 A | 6/2015 |

OTHER PUBLICATIONS

Wi-Fi Neighbor Awareness Networking (NAN)Technical Specification Version 1.0,Wi-Fi Alliance,dated May 1, 2015,total 98 pages.
Neighbor Awareness Networking Technical Specification Version 2.0,Wi-Fi Alliance,dated Oct. 20, 2017,total 184 pages.
Xingqin Lin et al. An Overview of 3GPP Device-to-Device Proximity Services, IEEE Communications Magazine,Apr. 2014, pp. 40-48. XP011546525.

* cited by examiner

| Field name | Bit |
|---|---|
| Element identifier | 1 |
| Length | 1 |
| Transmission stream information | 3 |
| Nominal MSDU size | 2 |
| Maximum MSDU size | 2 |
| Minimum service interval | 4 |
| Maximum service interval | 4 |
| Static interval | 4 |
| Pause interval | 4 |
| Service start time | 4 |
| Minimum data transmission rate | 4 |
| Average data transmission rate | 4 |
| Peak data transmission rate | 4 |
| Traffic burst size | 4 |
| Delay range | 4 |
| Minimum physical rate | 4 |
| Remaining bandwidth quota | 2 |
| Media time | 2 |

FIG. 2B

DATA LINK ESTABLISHMENT METHOD
AND APPARATUS

CROSS-REFERENCE TO RELATED
APPLICATIONS

The present application is the national phase of International Application No. PCT/CN2016/104949, filed on Nov. 7, 2016, which claims priority to Chinese Application No. 201510771716.6, filed on Nov. 12, 2015, both of which are incorporated herein by reference in their entireties.

TECHNICAL FIELD

The present invention relates to the field of communications technologies, and in particular, to a data link establishment method and an apparatus.

BACKGROUND

Compared with conventional wired network facilities, wireless communications technologies have advantages of rapid deployment and easy accessibility, and therefore are widely used and are still rapidly growing. The wireless communications technologies such as Wi-Fi (Wireless Fidelity, Wireless Fidelity) and Bluetooth allow data to be transmitted on 2.4 G/5 G/60 G and other communication frequency bands. Compared with Bluetooth, Wi-Fi has an advantage of a higher transmission rate and is widely used in a variety of industries.

An NAN (Neighbor Awareness Network, neighbor awareness networking) technology based on Wi-Fi, which is also referred to as a Wi-Fi aware technology, allows all devices participating in NAN to be synchronized without a central node. NAN maintenance work and service discovery work are performed in an NAN-agreed DW (Discovery Window, discovery window). In this way, a Wi-Fi device continuously discovers a nearby device and application and nearby information before creating a connection. A user may configure the application to publish the user's information and application acceptance information. It is further proposed in NAN 2.0 that, after NAN devices discover each other, an NDL (NAN Data Link, NAN data link) is further established. Time-frequency resources used by the NDL are some time periods between two adjacent DWs (that is, in a DW interval) and some channels in channels 1 to 11.

To reduce power consumption of an NAN device, a technology of using an NPS (NAN Proxy Server, NAN proxy server) to serve as proxy for the NAN device to perform service discovery is proposed. The NPS is an NAN device having a service proxy discovery function, and can be served as by an adequately powered device. To reduce power consumption, an NPC (NAN Proxy Client, NAN proxy client) registers its service discovery information with the NPS, for example, registers a service that can be provided by the NPC with the NPS, or registers a service to which the NPC needs to subscribe with the NPS, and specifies a sleep rule of the NPC, such as a sleep window or an operating window, for the NPS. In a period in which the NPC sleeps, when an NAN device initiates a service discovery request for the service, the NPS responds instead of the NPC, and notifies the NAN device of information about and the sleep rule of the NPC, or notifies the NPC of information about the NAN device when the NPC ends sleeping, so that the NAN device and the NPC discover each other. For example, the NAN device sends a trigger message to the NPC when the NPC ends sleeping, or the NPC sends a trigger message to the NAN device when the NPC ends sleeping, and an NDL (NAN Data Link, NAN data link) is subsequently established. For details, refer to FIG. 1A.

However, when the NPC and the NAN device are outside a wireless transmission range of each other, or a one-way channel problem exists between the NPC and the NAN device, that is, one party can properly receive a message from the other party, but the other party cannot properly receive a message sent to the other party, the NPC and the NAN device cannot properly communicate with each other. In this case, even if the NAN device obtains the information about the NPC, the NAN device still cannot successfully establish an NDL with the NPC, as shown in FIG. 1B.

In some other scenarios, for example, a first NAN device obtains service information of a second NAN device by using an upper-layer application, or the first NAN device receives a service discovery message from the second NAN device in a service discovery process, where the service discovery message carries the service information of the second NAN device. However, when an NDL establishment request is initiated to the second NAN device, a response cannot be obtained from the second NAN device. Consequently, an NDL cannot be established.

SUMMARY

Embodiments of the present invention provide a data link establishment method and an apparatus to resolve a prior-art disadvantage of failing to establish an NDL.

According to a first aspect, a data link establishment method is provided, including:

receiving, by a first neighbor awareness networking NAN device, a relay request message sent by a second NAN device, where the relay request message is used to request the first NAN device to establish an NAN data link NDL that uses the first NAN device as a relay, and the NDL is a data link between the second NAN device and a third NAN device;

determining, by the first NAN device, first time-frequency resource information and second time-frequency resource information according to the relay request message; and establishing, by the first NAN device with the second NAN device, a first NDL that uses the first time-frequency resource information, and establishing, with the third NAN device, a second NDL that uses the second time-frequency resource information.

With reference to the first aspect, in a first possible implementation, the determining, by the first NAN device, first time-frequency resource information and second time-frequency resource information according to the relay request message includes:

determining, by the first NAN device itself, the first time-frequency resource information and the second time-frequency resource information according to the relay request message; or receiving, by the first NAN device according to the relay request message, time-frequency resource information sent by the second NAN device, and determining the first time-frequency resource information and the second time-frequency resource information according to the time-frequency resource information sent by the second NAN device; or receiving, by the first NAN device according to the relay request message, time-frequency resource information sent by the third NAN device, and determining the first time-frequency resource information and the second time-frequency resource information according to the time-frequency resource information sent by the third NAN device; or receiving, by the first NAN device according to the relay request message, time-frequency resource information sent by the second NAN device, and using the time-frequency resource information sent by the second NAN device as the first time-frequency resource information; and receiving time-frequency resource information sent by the third NAN device, and using the received time-frequency resource information as the second time-frequency resource information.

With reference to the first possible implementation of the first aspect, in a second possible implementation, before the determining, by the first NAN device itself, the first time-frequency resource information and the second time-frequency resource information according to the relay request message, the method further includes:

obtaining, by the first NAN device, first service information of the third NAN device and/or second service information of the second NAN device; and the determining, by the first NAN device itself, the first time-frequency resource information and the second time-frequency resource information according to the relay request message includes:

determining, by the first NAN device itself, the first time-frequency resource information and the second time-frequency resource information based on the relay request message according to the first service information and/or the second service information.

With reference to the first or the second possible implementation of the first aspect, in a third possible implementation, the determining, by the first NAN device itself, the first time-frequency resource information and the second time-frequency resource information based on the relay request message according to the first service information and/or the second service information includes:

determining, by the first NAN device itself, the first time-frequency resource information and the second time-frequency resource information based on the relay request message according to at least one of: time-frequency resource information included in the first service information, time-frequency resource information included in the second service information, or information about time-frequency resources supported by the first NAN device; or determining, by the first NAN device itself, the first time-frequency resource information and the second time-frequency resource information based on the relay request message according to first service identifier information included in the first service information and second service identifier information included in the second service information.

With reference to the third possible implementation of the first aspect, in a fourth possible implementation, the determining, by the first NAN device itself, the first time-frequency resource information and the second time-frequency resource information based on the relay request message according to the first service information and/or the second service information includes:

determining, by the first NAN device itself, the first time-frequency resource information and the second time-frequency resource information based on the relay request message according to first QoS information included in the first service information and/or second QoS information included in the second service information.

With reference to the third or the fourth possible implementation of the first aspect, in a fifth possible implementation, the determining, by the first NAN device itself, the first time-frequency resource information and the second time-frequency resource information based on the relay request message according to at least one of: time-frequency resource information included in the first service information, time-frequency resource information included in the second service information, or information about time-frequency resources supported by the first NAN device includes:

determining, by the first NAN device itself based on the relay request message, the first time-frequency resource information according to the time-frequency resource information included in the first service information and the information about time-frequency resources supported by the first NAN device; and determining the second time-frequency resource information according to the time-frequency resource information included in the second service information and the information about time-frequency resources supported by the first NAN device; or determining, by the first NAN device itself, the first time-frequency resource information and the second time-frequency resource information based on the relay request message according to the time-frequency resource information included in the second service information and the information about time-frequency resources supported by the first NAN device; or determining, by the first NAN device itself, the first time-frequency resource information and the second time-frequency resource information based on the relay request message according to the time-frequency resource information included in the first service information and the information about time-frequency resources supported by the first NAN device; or determining, by the first NAN device itself, the first time-frequency resource information and the second time-frequency resource information based on the relay request message according to the time-frequency resource information included in the first service information and the time-frequency resource information included in the second service information.

With reference to the first to the fifth possible implementations of the first aspect, in a sixth possible implementation, the obtaining, by the first NAN device, first service information of the third NAN device includes:

receiving, by the first NAN device, a service registration message sent by the third NAN device, and obtaining the first service information from the service registration message; or receiving, by the first NAN device, a service discovery message sent by the third NAN device, and obtaining the first service information from the service discovery message; or receiving, by the first NAN device, a service information notification message sent by the third NAN device, and obtaining the first service information from the service information notification message; or obtaining, by the first NAN device, the first service information of the third NAN device by using an upper-layer application.

With reference to the first to the sixth possible implementations of the first aspect, in a seventh possible implementation, the obtaining, by the first NAN device, second service information of the second NAN device includes:

obtaining, by the first NAN device, the second service information from the relay request message; or sending, by the first NAN device, a service discovery message to the second NAN device, receiving a service discovery response message sent by the second NAN device, and obtaining the second service information from the service discovery response message; or receiving, by the first NAN device, a service discovery message sent by the second NAN device, and obtaining the second service information from the service discovery message; or obtaining, by the first NAN device, the second service information by using an upper-layer application.

With reference to the first aspect or the first to the seventh possible implementations of the first aspect, in an eighth possible implementation, before the receiving, by a first NAN device, a relay request message sent by a second NAN device, the method further includes:

receiving, by the first NAN device, an SDF subscribe message sent by the second NAN device, where the SDF subscribe message is used to search for a service required by the second NAN device; and sending, by the first NAN device, an SDF publish message to the second NAN device when determining that the service required by the second NAN device matches a service that the third NAN device can provide, where the SDF publish message carries information about the service that the third NAN device can provide.

According to a second aspect, a data link establishment method is provided, including:

sending, by a second neighbor awareness networking NAN device, a relay request message to a first NAN device, where the relay request message is used to request the first NAN device to establish an NAN data link NDL that uses the first NAN device as a relay, and the NDL is a data link between the second NAN device and a third NAN device;

determining, by the second NAN device, first time-frequency resource information; and establishing, by the second NAN device with the first NAN device, a first NDL that uses the first time-frequency resource information.

With reference to the second aspect, in a first possible implementation, the determining, by the second NAN device, first time-frequency resource information includes:

determining, by the second NAN device itself, the first time-frequency resource information; or receiving, by the second NAN device, time-frequency resource information sent by the first NAN device, and using the time-frequency resource information sent by the first NAN device as the first time-frequency resource information.

With reference to the first possible implementation of the second aspect, in a second possible implementation, before the determining, by the second NAN device itself, the first time-frequency resource information, the method further includes:

obtaining, by the second NAN device, third service information of the third NAN device and/or second service information of the second NAN device; and the determining, by the second NAN device itself, the first time-frequency resource information includes:

determining, by the second NAN device itself, the first time-frequency resource information according to the third service information and/or the second service information.

With reference to the first or the second possible implementation of the second aspect, in a third possible implementation, the determining, by the second NAN device itself, the first time-frequency resource information according to the third service information and/or the second service information includes:

determining, by the second NAN device itself, the first time-frequency resource information according to at least one of: time-frequency resource information included in the third service information, time-frequency resource information included in the second service information, or information about time-frequency resources supported by the first NAN device; or determining, by the second NAN device itself, the first time-frequency resource information according to first service identifier information included in the third service information and second service identifier information included in the second service information.

With reference to the second or the third possible implementation of the second aspect, in a fourth possible implementation, the determining, by the second NAN device itself, the first time-frequency resource information according to the third service information and/or the second service information includes:

determining, by the second NAN device itself, the first time-frequency resource information according to first QoS information included in the third service information and/or second QoS information included in the second service information.

With reference to the third or the fourth possible implementation of the second aspect, in a fifth possible implementation, the determining, by the second NAN device itself, the first time-frequency resource information according to at least one of: time-frequency resource information included in the third service information, time-frequency resource information included in the second service information, or information about time-frequency resources supported by the first NAN device includes:

determining, by the second NAN device itself, the first time-frequency resource information according to the time-frequency resource information included in the third service information and the information about time-frequency resources supported by the first NAN device; or determining, by the second NAN device itself, the first time-frequency resource information according to the time-frequency resource information included in the second service information and the information about time-frequency resources supported by the first NAN device; or determining, by the second NAN device itself, the first time-frequency resource information according to the time-frequency resource information included in the third service information and the time-frequency resource information included in the second service information.

With reference to the second aspect or the first to the fifth possible implementations of the second aspect, in a sixth possible implementation, before the sending, by a second NAN device, a relay request message to a first NAN device, the method further includes:

determining, by the second NAN device, that the second NAN device cannot connect to the third NAN device.

With reference to the sixth possible implementation of the second aspect, in a seventh possible implementation, the determining, by the second NAN device, that the second NAN device cannot connect to the third NAN device includes:

obtaining, by the second NAN device, the third service information of the third NAN device, sending a service discovery message to the third NAN device according to the third service information, and when no service discovery response message sent by the third NAN device is received in preset duration, determining that the second NAN device cannot connect to the third NAN device; or obtaining, by the second NAN device, the third service information of the third NAN device, sending a service link connection request message to the third NAN device according to the third service information, and when no service link connection response message sent by the third NAN device is received in preset duration, determining that the second NAN device cannot connect to the third NAN device.

With reference to the fifth or the seventh possible implementation of the second aspect, in an eighth possible implementation, the obtaining, by the second NAN device, the third service information of the third NAN device includes:

receiving, by the second NAN device, the third service information sent by the first NAN device; or receiving, by the second NAN device, a service discovery message sent by the third NAN device, and obtaining the third service information from the service discovery message; or obtaining, by the second NAN device, the third service information by using an upper-layer application.

With reference to the second aspect or the first to the eighth possible implementations of the second aspect, in a ninth possible implementation, before the sending, by an NAN device, a relay request message to a first NAN device, the method further includes:

obtaining, by the second NAN device, device information of the first NAN device; and the sending, by a second NAN device, a relay request message to a first NAN device includes:

sending, by the second NAN device, the relay request message to the first NAN device according to the device information of the first NAN device.

With reference to the ninth possible implementation of the second aspect, in a tenth possible implementation, the obtaining, by the second NAN device, device information of the first NAN device includes:

sending, by the second NAN device, a service discovery message, receiving a service discovery response message sent by the first NAN device, and obtaining the device information of the first NAN device from the service discovery response message; or obtaining, by the second NAN device, the device information of the first NAN device from a service discovery message sent by the first NAN device; or obtaining, by the second NAN device, the device information of the first NAN device from a relay request response message sent by the first NAN device; or obtaining, by the second NAN device, the device information of the first NAN device by using an upper-layer application.

According to a third aspect, a first neighbor awareness networking NAN device is provided, including:

a receiving unit, configured to receive a relay request message sent by a second NAN device, where the relay request message is used to request the first NAN device to establish an NAN data link NDL that uses the first NAN device as a relay, and the NDL is a data link between the second NAN device and a third NAN device; and a processing unit, configured to determine first time-frequency resource information and second time-frequency resource information according to the relay request message; where the processing unit is further configured to establish, with the second NAN device, a first NDL that uses the first time-frequency resource information, and establish, with the third NAN device, a second NDL that uses the second time-frequency resource information.

With reference to the third aspect, in a first possible implementation, that the processing unit determines the first time-frequency resource information and the second time-frequency resource information according to the relay request message is specifically:

the processing unit itself determines the first time-frequency resource information and the second time-frequency resource information according to the relay request message; or receives, according to the relay request message, time-frequency resource information sent by the second NAN device, and determines the first time-frequency resource information and the second time-frequency resource information according to the time-frequency resource information sent by the second NAN device; or receives, according to the relay request message, time-frequency resource information sent by the third NAN device, and determines the first time-frequency resource information and the second time-frequency resource information according to the time-frequency resource information sent by the third NAN device; or the receiving unit is further configured to receive time-frequency resource information sent by the second NAN device and time-frequency resource information sent by the third NAN device; and the processing unit uses the time-frequency resource information that is sent by the second NAN device and received by the receiving unit as the first time-frequency resource information, and uses the time-frequency resource information received by the receiving unit as the second time-frequency resource information.

With reference to the first possible implementation of the third aspect, in a second possible implementation, the processing unit is further configured to obtain first service information of the third NAN device and/or second service information of the second NAN device; and that the processing unit itself determines the first time-frequency resource information and the second time-frequency resource information according to the relay request message is specifically:

the processing unit itself determines the first time-frequency resource information and the second time-frequency resource information based on the relay request message according to the first service information and/or the second service information.

With reference to the first or the second possible implementation of the third aspect, in a third possible implementation, that the processing unit itself determines the first time-frequency resource information and the second time-frequency resource information based on the relay request message according to the first service information and/or the second service information is specifically:

the processing unit itself determines the first time-frequency resource information and the second time-frequency resource information based on the relay request message according to at least one of: time-frequency resource information included in the first service information, time-frequency resource information included in the second service information, or information about time-frequency resources supported by the first NAN device; or the processing unit itself determines the first time-frequency resource information and the second time-frequency resource information based on the relay request message according to first service identifier information included in the first service information and second service identifier information included in the second service information.

With reference to the third possible implementation of the third aspect, in a fourth possible implementation, that the processing unit itself determines the first time-frequency resource information and the second time-frequency resource information based on the relay request message according to the first service information and/or the second service information is specifically:

the processing unit itself determines the first time-frequency resource information and the second time-frequency resource information based on the relay request message according to first QoS information included in the first service information and/or second QoS information included in the second service information.

With reference to the third or the fourth possible implementation of the third aspect, in a fifth possible implementation, that the processing unit itself determines the first time-frequency resource information and the second time-frequency resource information based on the relay request message according to at least one of: time-frequency resource information included in the first service information, time-frequency resource information included in the second service information, or information about time-frequency resources supported by the first NAN device is specifically:

the processing unit itself determines, based on the relay request message, the first time-frequency resource information according to the time-frequency resource information included in the first service information and the information about time-frequency resources supported by the first NAN device, and determines the second time-frequency resource information according to the time-frequency resource information included in the second service information and the information about time-frequency resources supported by the first NAN device; or the processing unit itself determines the first time-frequency resource information and the second time-frequency resource information based on the relay request message according to the time-frequency resource information included in the second service information and the information about time-frequency resources supported by the first NAN device; or the processing unit itself determines the first time-frequency resource information and the second time-frequency resource information based on the relay request message according to the time-frequency resource information included in the first service information and the information about time-frequency resources supported by the first NAN device; or the processing unit itself determines the first time-frequency resource information and the second time-frequency resource information based on the relay request message according to the time-frequency resource information included in the first service information and the time-frequency resource information included in the second service information.

With reference to the first to the fifth possible implementations of the third aspect, in a sixth possible implementation, the receiving unit is further configured to receive a service registration message sent by the third NAN device, a service discovery message sent by the third NAN device, or a service information notification message sent by the third NAN device; and that the processing unit obtains the first service information of the third NAN device is specifically:

obtaining the first service information from the service registration message; or obtaining the first service information from the service discovery message; or obtaining the first service information from the service information notification message; or obtaining the first service information of the third NAN device by using an upper-layer application.

With reference to the first to the sixth possible implementations of the third aspect, in a seventh possible implementation, a sending unit is further included and configured to send a service discovery message to the second NAN device, and the receiving unit is further configured to receive a service discovery response message sent by the second NAN device;

the receiving unit is further configured to receive a service discovery message sent by the second NAN device; and that the processing unit obtains the second service information of the second NAN device is specifically:

obtaining the second service information from the relay request message; or obtaining the second service information from the service discovery response message; or obtaining the second service information from the service discovery message; or obtaining the second service information by using an upper-layer application.

With reference to the third aspect or the first to the seventh possible implementations of the third aspect, in an eighth possible implementation, the receiving unit is further configured to receive an SDF subscribe message sent by the second NAN device, and the SDF subscribe message is used to search for a service required by the second NAN device;

the processing unit is further configured to determine that the service required by the second NAN device matches a service that the third NAN device can provide; and the sending unit is further included and configured to send an SDF publish message to the second NAN device when the processing unit determines that the service required by the second NAN device matches the service that the third NAN device can provide, where the SDF publish message carries information about the service that the third NAN device can provide.

According to a fourth aspect, a second neighbor awareness networking NAN device is provided, including:

a sending unit, configured to send a relay request message to a first NAN device, where the relay request message is used to request the first NAN device to establish an NAN data link NDL that uses the first NAN device as a relay, and the NDL is a data link between the second NAN device and a third NAN device; and a processing unit, configured to determine first time-frequency resource information; where the processing unit is further configured to establish, with the first NAN device, a first NDL that uses the first time-frequency resource information.

With reference to the fourth aspect, in a first possible implementation, a receiving unit is further included and configured to receive time-frequency resource information sent by the first NAN device; and that the processing unit determines the first time-frequency resource information is specifically:

the processing unit itself determines the first time-frequency resource information; or uses the time-frequency resource information that is sent by the first NAN device and received by the receiving unit as the first time-frequency resource information.

With reference to the first possible implementation of the fourth aspect, in a second possible implementation, the processing unit is further configured to obtain third service information of the third NAN device and/or second service information of the second NAN device; and that the processing unit itself determines the first time-frequency resource information is specifically:

the processing unit itself determines the first time-frequency resource information according to the third service information and/or the second service information.

With reference to the first or the second possible implementation of the fourth aspect, in a third possible implementation, that the processing unit itself determines the first time-frequency resource information according to the third service information and/or the second service information is specifically:

the processing unit itself determines the first time-frequency resource information according to at least one of: time-frequency resource information included in the third service information, time-frequency resource information included in the second service information, or information about time-frequency resources supported by the first NAN device; or the processing unit itself determines the first time-frequency resource information according to first service identifier information included in the third service information and second service identifier information included in the second service information.

With reference to the second or the third possible implementation of the fourth aspect, in a fourth possible implementation, that the processing unit itself determines the first time-frequency resource information according to the third service information and/or the second service information is specifically:

the processing unit itself determines the first time-frequency resource information according to first QoS information included in the third service information and/or second QoS information included in the second service information.

With reference to the third or the fourth possible implementation of the fourth aspect, in a fifth possible implementation, that the processing unit itself determines the first time-frequency resource information according to at least one of: time-frequency resource information included in the third service information, time-frequency resource information included in the second service information, or information about time-frequency resources supported by the first NAN device is specifically:

the processing unit itself determines the first time-frequency resource information according to the time-frequency resource information included in the third service information and the information about time-frequency resources supported by the first NAN device; or the processing unit itself determines the first time-frequency resource information according to the time-frequency resource information included in the second service information and the information about time-frequency resources supported by the first NAN device; or the processing unit itself determines the first time-frequency resource information according to the time-frequency resource information included in the third service information and the time-frequency resource information included in the second service information.

With reference to the fourth aspect or the first to the fifth possible implementations of the fourth aspect, in a sixth possible implementation, the processing unit is further configured to determine that the second NAN device cannot connect to the third NAN device.

With reference to the sixth possible implementation of the fourth aspect, in a seventh possible implementation, that the processing unit determines that the second NAN device cannot connect to the third NAN device is specifically:

obtaining the third service information of the third NAN device, sending, by the sending unit, a service discovery message to the third NAN device according to the third service information, and when the receiving unit receives, in preset duration, no service discovery response message sent by the third NAN device, determining, by the processing unit, that the second NAN device cannot connect to the third NAN device; or obtaining the third service information of the third NAN device, sending, by the sending unit, a service link connection request message to the third NAN device according to the third service information, and when the receiving unit receives, in preset duration, no service link connection response message sent by the third NAN device, determining, by the processing unit, that the second NAN device cannot connect to the third NAN device.

With reference to the fifth or the seventh possible implementation of the fourth aspect, in an eighth possible implementation, the receiving unit is further included and configured to receive the third service information sent by the first NAN device, or receive a service discovery message sent by the third NAN device; and that the processing unit obtains the third service information of the third NAN device is specifically:

using the third service information that is sent by the first NAN device and received by the receiving unit as the third service information; or obtaining the third service information from the service discovery message; or obtaining the third service information by using an upper-layer application.

With reference to the fourth aspect or the first to the eighth possible implementations of the fourth aspect, in a ninth possible implementation, the processing unit is further configured to obtain device information of the first NAN device; and that the sending unit sends the relay request message to the first NAN device is specifically:

sending the relay request message to the first NAN device according to the device information of the first NAN device.

With reference to the ninth possible implementation of the fourth aspect, in a tenth possible implementation, the sending unit is further configured to send a service discovery message, and the receiving unit is further included and configured to receive a service discovery response message sent by the first NAN device;

the receiving unit is further configured to receive a service discovery message sent by the first NAN device, or receive a relay request response message sent by the first NAN device; and that the processing unit obtains the device information of the first NAN device is specifically:

obtaining the device information of the first NAN device from the service discovery response message received by the receiving unit; or obtaining the device information of the first NAN device from the service discovery message that is sent by the first NAN device and received by the receiving unit; or obtaining the device information of the first NAN device from the relay request response message that is sent by the first NAN device and received by the receiving unit; or obtaining the device information of the first NAN device by using an upper-layer application.

In the embodiments of the present invention, the data link establishment method and the apparatus are provided. In the solution, the second NAN device sends the relay request message to the first NAN device, so as to trigger the first NAN device to establish the first NDL with the second device and establish the second NDL with the third NAN device. In this way, the second NAN device successfully establishes a connection to the third NAN device. This resolves a prior-art disadvantage of failing to establish an NDL.

BRIEF DESCRIPTION OF DRAWINGS

FIG. 2B is a schematic diagram of a TSPEC element structure according to an embodiment of the present invention;

DESCRIPTION OF EMBODIMENTS

Figure 1A:
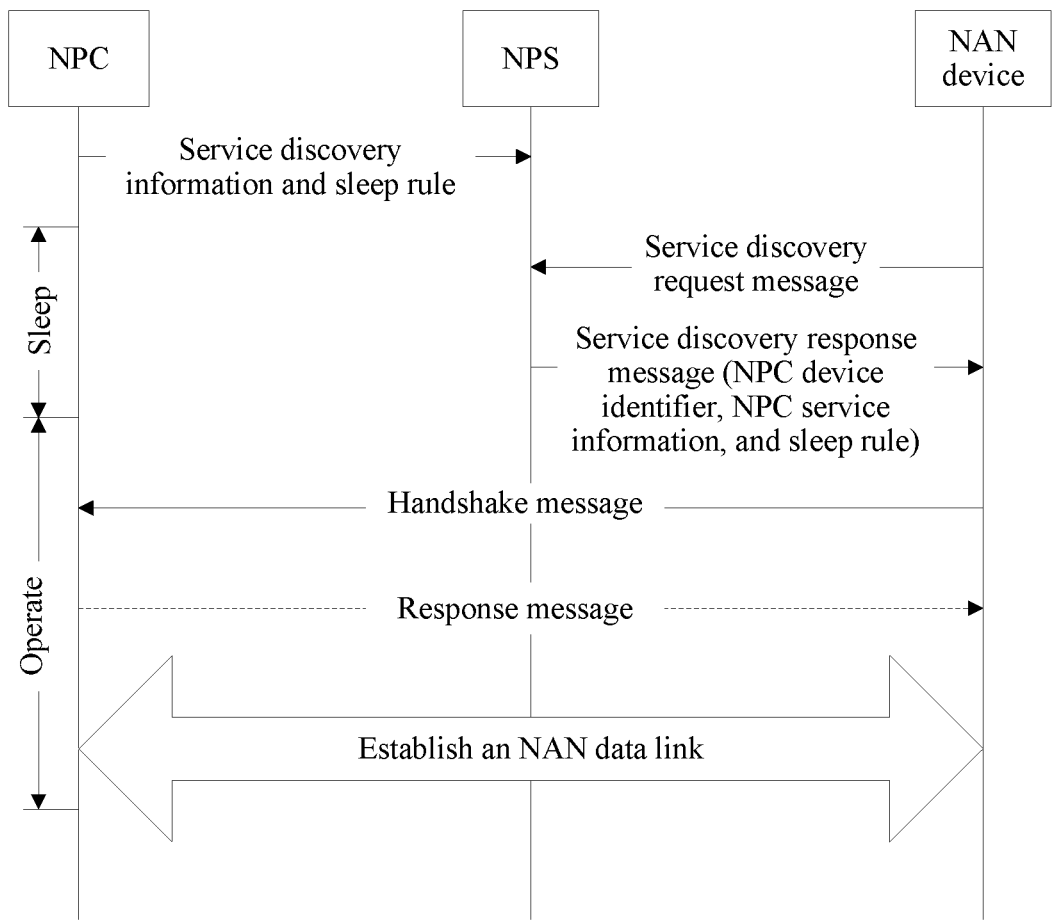
FIG. 1A is a schematic diagram of successfully establishing an NDL between NAN devices in the prior art.
Figure 1B:
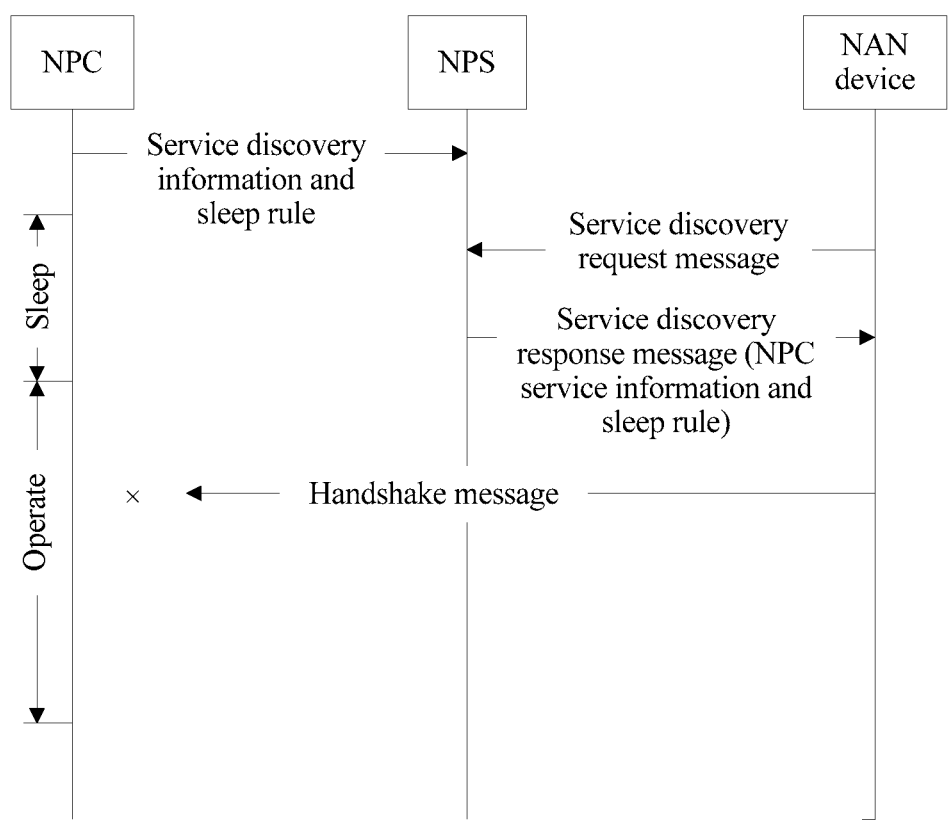
FIG. 1B is a schematic diagram of failing to establish an NDL between NAN devices in the prior art.

To make the objectives, technical solutions, and advantages of the present invention clearer, the following further describes the present invention in detail with reference to the accompanying drawings. Apparently, the described embodiments are merely some but not all of the embodiments of the present invention. All other embodiments obtained by persons of ordinary skill in the art based on the embodiments of the present invention without creative efforts shall fall within the protection scope of the present invention.

To facilitate understanding of the embodiments of the present invention, the following describes basic technologies related to the embodiments of the present invention.

NAN device service discovery procedure:

Step 1: After activating an NAN function, an NAN device performs passive scanning and may become an AM (Anchor Master, anchor master) and create a cluster.

Step 2: When receiving an NAN beacon message sent by one or more NAN devices in another cluster, the NAN device joins a cluster having a largest CG (Cluster Grade, cluster grade) value.

Step 3: After joining the cluster, the NAN device synchronizes with an AM in the cluster, and synchronizes information about the NAN device with information about the AM.

Step 4: The NAN device sends an SDF (Service Discovery Function, service discovery function) message in a DW to perform service discovery.

In this step, performing service discovery includes service query and service publishing.

Once a service of another NAN device is matched, the another NAN device may reply to the SDF message in the DW.

SDF message: An SDF message is a specially defined action frame (Action Frame) for service discovery. According to different functions, SDF messages are classified into three types: an SDF subscribe (subscribe) message, an SDF publish (publish) message, and an SDF follow-up (follow-up) message. An SDF message has an indication bit that indicates a type of the SDF message.

SDF subscribe message: used by the NAN device to search for a service that needs to be used.

SDF publish message: used by the NAN device to publish a service that the NAN device can provide or to reply to a received SDF subscribe message.

SDF follow-up message: used by the NAN device to reply to a received SDF publish message or to negotiate more information.

SDF message format: The SDF message carries different NAN attributes to represent service information, and forcibly carries an NAN attribute named service descriptor attribute.

Service descriptor attribute: The service descriptor attribute is used to describe a service and includes an SDF message type (publish/subscribe/follow up), a service ID (Identity, identity), and the like.

After completing service discovery, the NAN device further establishes an NDL. A process is as follows:

When two NAN devices establish an NDL, the two NAN devices need to determine a common time-frequency resource according to their respective time-frequency resources, and perform a data link establishment process and/or perform service data transmission on the time-frequency resource. Alternatively, the two NAN devices may further coordinate, on the time-frequency resource, a time-frequency resource for transmitting service data, and then transmit service data on the time-frequency resource obtained through negotiation.

A time-frequency resource may include timeslot (time slot) information and frequency information to indicate that the NAN device operates on a channel indicated by channel information in a time period indicated by the timeslot information.

Further, to improve resource utilization, the time-frequency resource may be canceled after the NAN devices complete data transmission on the time-frequency resource.

On the time-frequency resource for transmitting service data, an NAN device may directly transmit data to a peer NAN device or transmit data in a paging manner.

The following describes preferred implementations of the present invention in detail with reference to the accompanying drawings in this specification.

It should be understood that, the preferred embodiments described herein are merely used to describe and explain the present invention, but are not intended to limit the present invention. In addition, the embodiments in this application and features in the embodiments may be mutually combined if they do not conflict with each other.

The following describes the embodiments of the present invention in detail with reference to the accompanying drawings.

Figure 2A:
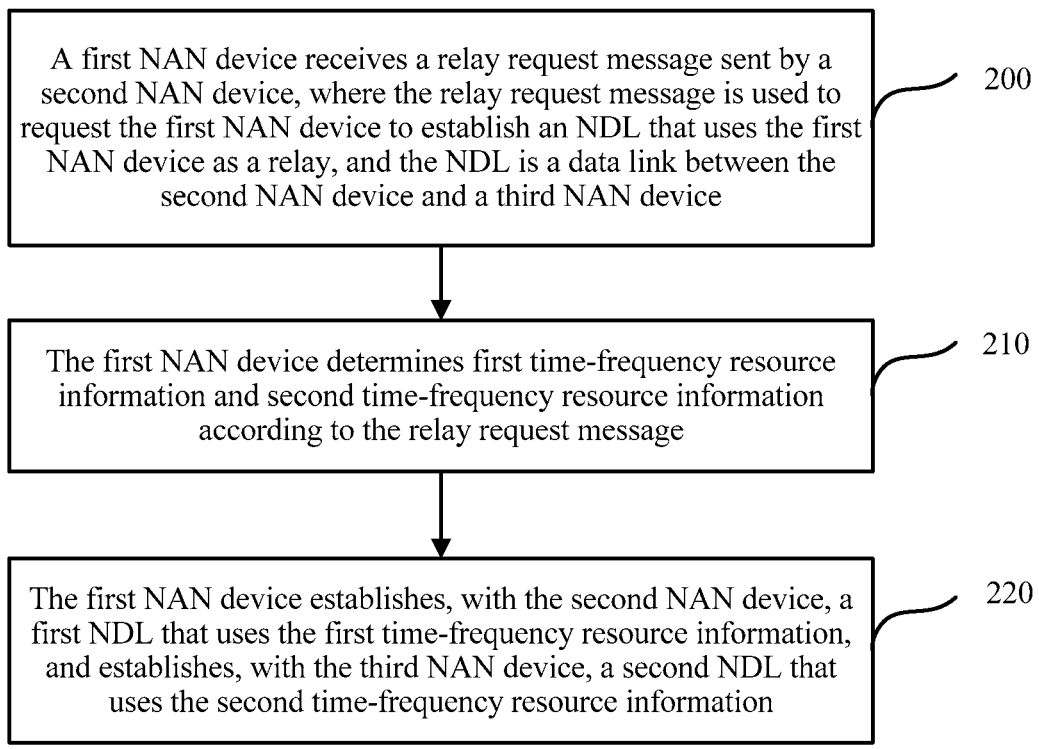
FIG. 2A is a flowchart of data link establishment according to an embodiment of the present invention.

As shown in FIG. 2A, in an embodiment of the present invention, a data link establishment procedure is as follows:

Step 200: A first NAN device receives a relay request message sent by a second NAN device, where the relay request message is used to request the first NAN device to establish an NDL that uses the first NAN device as a relay, and the NDL is a data link between the second NAN device and a third NAN device.

Step 210: The first NAN device determines first time-frequency resource information and second time-frequency resource information according to the relay request message.

Step 220: The first NAN device establishes, with the second NAN device, a first NDL that uses the first time-frequency resource information, and establishes, with the third NAN device, a second NDL that uses the second time-frequency resource information.

In this embodiment of the present invention, optionally, the first NAN device may determine the first time-frequency resource information and the second time-frequency resource information according to the relay request message in the following several manners:

The first NAN device itself determines the first time-frequency resource information and the second time-frequency resource information according to the relay request message.

In this embodiment of the present invention, before the first NAN device itself determines the first time-frequency resource information and the second time-frequency resource information according to the relay request message, the following operation is further included:

The first NAN device obtains first service information of the third NAN device and/or second service information of the second NAN device.

In this case, optionally, the first NAN device itself may determine the first time-frequency resource information and the second time-frequency resource information according to the relay request message in the following manner:

The first NAN device itself determines the first time-frequency resource information and the second time-frequency resource information based on the relay request message according to the first service information and/or the second service information.

In this embodiment of the present invention, before the first NAN device itself determines the first time-frequency resource information and the second time-frequency resource information according to the relay request message, the first NAN device obtains the first service information of the third NAN device and/or the second service information of the second NAN device. However, a time sequence of obtaining, by the first NAN device, the first service information and/or the second service information and receiving the relay request message is not specifically limited. That is, the first NAN device may first obtain the first service information and/or the second service information and then receive the relay request message, or may first receive the relay request message and then obtain the first service information and/or the second service information.

Likewise, if the first NAN device needs to obtain both the first service information and the second service information, the first NAN device may first obtain the first service information and then obtain the second service information, or may first obtain the second service information and then obtain the first service information. This is not specifically limited herein.

Likewise, in this embodiment of the present invention, a time sequence of determining, by the first NAN device, the first time-frequency resource information and the second time-frequency resource information according to the relay request message is not specifically limited. For example, the first NAN device may first determine the first time-frequency resource information and then determine the second time-frequency resource information according to the relay request message, or may first determine the second time-frequency resource information and then determine the first time-frequency resource information according to the relay request message.

In this embodiment of the present invention, optionally, the first NAN device itself may determine the first time-frequency resource information and the second time-frequency resource information based on the relay request message according to the first service information and/or the second service information in the following manner:

The first NAN device itself determines the first time-frequency resource information and the second time-frequency resource information based on the relay request message according to at least one of: time-frequency resource information included in the first service information, time-frequency resource information included in the second service information, or information about time-frequency resources supported by the first NAN device.

For example, an overlapping part between a time-frequency resource of the second NAN device and an available time-frequency resource of the first NAN device itself is used as a first time-frequency resource, and an overlapping part between a time-frequency resource of the third NAN device and the available time-frequency resource of the first NAN device itself is used as a second time-frequency resource. Alternatively, an overlapping part among the time-frequency resource of the third NAN device, the time-frequency resource of the second NAN device, and the available time-frequency resource of the first NAN device itself may be used as the first time-frequency resource and the second time-frequency resource. In this case, the first time-frequency resource is the same as the second time-frequency resource.

Further, the first NAN device may negotiate with the second NAN device to determine a final time-frequency resource.

For example, the first NAN device sends a preferred time-frequency resource of the first NAN device to the second NAN device, and uses the preferred time-frequency resource as the final time-frequency resource. If the second NAN device agrees to accept the time-frequency resource, in this case, the time-frequency resource may be used as a final first time-frequency resource and/or a final second time-frequency resource.

For another example, the second NAN device sends a preferred time-frequency resource of the second NAN device to the first NAN device, and uses the preferred time-frequency resource as the final time-frequency resource. If the first NAN device agrees to accept the time-frequency resource, in this case, the time-frequency resource may be used as a final first time-frequency resource and/or a final second time-frequency resource.

It should be noted that the time-frequency resource finally determined by the first NAN device may be consistent with an overlapping time-frequency resource, or may be inconsistent with the overlapping time-frequency resource. This is not specifically limited herein.

Optionally, the first NAN device itself may determine the first time-frequency resource information and the second time-frequency resource information based on the relay request message according to the first service information and/or the second service information in the following manner:

The first NAN device itself determines the first time-frequency resource information and the second time-frequency resource information based on the relay request message according to first service identifier information included in the first service information and second service identifier information included in the second service information.

In this embodiment of the present invention, the second NAN device may obtain a first service identifier. The second NAN device determines, according to a service represented by the first service identifier, that a service required by the second NAN device matches a service that the third NAN device can provide, support, subscribe to, or publish.

For example, when the first service identifier information represents a service to which a third device needs to subscribe, and the second NAN device can provide the third NAN device with the service to which the third NAN device needs to subscribe, the second NAN device determines that a service requirement of the second NAN device matches a service of the third NAN device.

For another example, when the first service identifier information represents a service that the third device can publish, and the second NAN device needs to subscribe to and use the service, the second NAN device determines that the service requirement of the second NAN device matches the service of the third NAN device.

It should be noted that, when the service requirement of the second NAN device matches the service of the third NAN device, the first service identifier information of the third NAN device is the same as the second service identifier information of the second NAN device.

When the first NAN device itself determines the first time-frequency resource information and the second time-frequency resource information based on the relay request message according to the first service identifier information included in the first service information and the second service identifier information included in the second service information, a possible manner is: converting service identifier information to obtain a numerical result, and determining the first time-frequency resource and the second time-frequency resource according to the numerical result with reference to a preset correspondence between numerical values and time-frequency resources. The first time-frequency resource may be the same as or different from the second time-frequency resource.

For example, a numerical value is obtained after SHA-1 or SHA-256 algorithm hashing is performed on the service identifier information and then three least significant bits are clipped out and converted into a decimal value. A corresponding time-frequency resource set is determined in the correspondence between numerical values and time-frequency resources according to the data value. Then the first time-frequency resource and the second time-frequency resource are determined in the time-frequency resource set.

In this embodiment of the present invention, optionally, the first service identifier is used to represent the service that the third NAN device can provide, support, subscribe to, or publish; a second service identifier is used to represent a service that the second NAN device can provide, support, subscribe to, or publish.

Optionally, the first NAN device itself may determine the first time-frequency resource information and the second time-frequency resource information based on the relay request message according to the first service information and/or the second service information in the following manner:

The first NAN device itself determines the first time-frequency resource information and the second time-frequency resource information based on the relay request message according to first QoS information included in the first service information and/or second QoS information included in the second service information.

In this embodiment of the present invention, when the first NAN device itself determines the first time-frequency resource information and the second time-frequency resource information according to the first QoS information included in the first service information and/or the second QoS information included in the second service information, the first NAN device itself may determine the first time-frequency resource information and the second time-frequency resource information according to the first QoS information; or determine the first time-frequency resource information and the second time-frequency resource information according to the first QoS information and the second QoS information; or select one piece of QoS information from the first QoS information and the second QoS information, and determine the first time-frequency resource information and the second time-frequency resource information according to the selected QoS information.

In this embodiment of the present invention, optionally, when a service indicated by QoS information requires a relatively short transmission delay, a relatively small time interval needs to be maintained between the first time-frequency resource and the second time-frequency resource. When the service indicated by the QoS information allows a relatively long transmission delay, there may be a relatively large time interval between the first time-frequency resource and the second time-frequency resource.

In this embodiment of the present invention, service information carries QoS information in a plurality of manners. For example, refer to an EDCA (Enhanced Distributed Channel Access, enhanced distributed channel access) mechanism specified in IEEE (Institute of Electrical and Electronics Engineers, Institute of Electrical and Electronics Engineers) 802.11. In the EDCA mechanism, services indicated by QoS information are classified into four categories: AC_BK (Access Category_Background, background access category), AC_BE (Access Category_Best Effort, best-effort access category), AC_VI (Access Category_Video, video access category), and AC_VO (Access Category_Voice, voice access category). Because the service categories require different transmission delays, when the service information carries the QoS information, time-frequency resources may be scheduled according to a QoS category indicating the service. Alternatively, the QoS information may be expressed by using TSPEC (Traffic Specification, traffic specification) elements in IEEE 802.11. A structure of the TSPEC elements is shown in FIG. 2B. The service information may carry all elements in FIG. 2B, or may carry some elements in FIG. 2B, for example, carry at least one of a minimum data transmission rate, an average data transmission rate, a peak data transmission rate, or a traffic burst size, or certainly may carry other elements in FIG. 2B, for example, carry at least one of a maximum service interval (Maximum Service Interval), a minimum service interval, a maximum data transmission rate (Maximum Data Rate), a minimum data transmission rate, an average data transmission rate, a maximum packet transmission time (Maximum packet transmission time), a preferred packet transmission time, a maximum transmission delay (Maximum Transmission Delay), a preferred data transmission delay, or a burst data packet size (Burst Size). In this case, in other words, QoS may indicate at least one of the maximum service interval, the minimum service interval, the maximum data transmission rate, the minimum data transmission rate, the average data transmission rate, the maximum packet transmission time, the preferred packet transmission time, the maximum transmission delay, the preferred data transmission delay, the burst data packet size, or the like that is required for ensuring user experience. Certainly, content indicated by the QoS may not be specifically limited herein.

The QoS information may alternatively be determined according to the service itself. For example, a real-time audio service requires a relatively high average data transmission rate to ensure smooth audio presentation; a text service requires only a relatively low minimum data transmission rate. Therefore, a device may determine a final requirement on quality of service according to a specific criterion based on the service itself. The QoS may be expressed by using a specific value, or may be expressed by using a preset category. This is not specifically limited in the present invention.

According to the foregoing description, when the first NAN device determines the first time-frequency resource information and the second time-frequency resource information according to the first service information and/or the second service information, the first NAN device itself determines the first time-frequency resource information and the second time-frequency resource information by using only the time-frequency resource information included in the first service information and/or the second service information; or determines the first time-frequency resource information and the second time-frequency resource information by using only the service identifier information included in the first service information and/or the second service information; or determines the first time-frequency resource information and the second time-frequency resource information by using only the QoS information included in the first service information and/or the second service information. Certainly, the first NAN device itself may alternatively determine the first time-frequency resource information and the second time-frequency resource information by using a combination of at two types of information in the foregoing three types of information.

That is, when the first NAN device itself determines the first time-frequency resource information and the second time-frequency resource information according to the first service information and/or the second service information, the first NAN device itself may determine the first time-frequency resource information and the second time-frequency resource information by using at least one of: the time-frequency resource information, the service identifier information, or the QoS information included in the first service information and/or the second service information.

For example, when the first NAN device itself determines the first time-frequency resource information and the second time-frequency resource information according to the first service information and/or the second service information, the first NAN device itself determines the first time-frequency resource information and the second time-frequency resource information by using the time-frequency resource information and the QoS information that are included in the first service information and/or the second service information.

In this embodiment of the present invention, optionally, the first NAN device itself may determine, in the following manner, the first time-frequency resource information and the second time-frequency resource information according to the time-frequency resource information and the QoS information that are included in the first service information and/or the second service information:

first, preliminarily determining the first time-frequency resource information and the second time-frequency resource information according to overlapping parts between the time-frequency resource information included in the first service information and any two time-frequency resources in the information about time-frequency resources supported by the first NAN device and between the time-frequency resource information included in the second service information and any two time-frequency resources in the information about time-frequency resources supported by the first NAN device; and then determining whether a time interval between the first time-frequency resource information and the second time-frequency resource information meets the maximum service interval required in the QoS information; if the time interval meets the maximum service interval, using the preliminarily determined first time-frequency resource information and second time-frequency resource information as final first time-frequency resource information and second time-frequency resource information; if the time interval does not meet the maximum service interval, further negotiating, by the first NAN device, with the second NAN device, for example, sending, by the first NAN device, third time-frequency resource information that meets the maximum service interval to the second NAN device; if the second NAN device accepts the third time-frequency resource information, using the preliminarily determined first time-frequency resource information as the final first time-frequency resource information, and using the third time-frequency resource information as the final second time-frequency resource information; if the second NAN device does not accept the third time-frequency resource information, further negotiating, by the first NAN device, with the third NAN device, and sending fourth time-frequency resource information that meets the maximum service interval to the third NAN device; if the third NAN device accepts the fourth time-frequency resource information, using the preliminarily determined first time-frequency resource information as the final first time-frequency resource information, and using the fourth time-frequency resource information as the final second time-frequency resource information.

It should be noted that, in the foregoing example for describing the process of determining, by the first NAN device itself, the first time-frequency resource information and the second time-frequency resource information according to the time-frequency resource information and the QoS information that are included in the first service information and/or the second service information, the QoS information indicates the maximum service interval. Certainly, the QoS information may alternatively indicate other information, for example, element information in FIG. 2B. Therefore, when the first NAN device itself determines the first time-frequency resource information and the second time-frequency resource information according to the time-frequency resource information and the QoS information that are included in the first service information and/or the second service information, the QoS information may indicate the maximum service interval, or may indicate other information. Details are not described herein.

It should be noted that, the maximum service interval required in the QoS information may be a maximum service interval required in the first QoS information, or may be a maximum service interval required in the second QoS information, or may be the larger value of the maximum service interval required in the first QoS information and the maximum service interval required in the second QoS information.

In this embodiment of the present invention, optionally, the first NAN device itself may determine, in the following manner, the first time-frequency resource information and the second time-frequency resource information according to the time-frequency resource information and the QoS information that are included in the first service information and/or the second service information:

first, preliminarily determining the first time-frequency resource information according to overlapping parts between the time-frequency resource information included in the first service information and any two time-frequency resources in the information about time-frequency resources supported by the first NAN device and between the time-frequency resource information included in the second service information and any two time-frequency resources in the information about time-frequency resources supported by the first NAN device; and preliminarily determining the second time-frequency resource information according to the QoS information; sending the second time-frequency resource information to the second NAN device, and if the second NAN device agrees to accept the second time-frequency resource, using the preliminarily determined first time-frequency resource information and second time-frequency resource information as the final first time-frequency resource information and second time-frequency resource information; or sending the second time-frequency resource information to the third NAN device, and if the third NAN device agrees to accept the second time-frequency resource, using the preliminarily determined first time-frequency resource information and second time-frequency resource information as the final first time-frequency resource information and second time-frequency resource information.

In this embodiment of the present invention, the time-frequency resource information included in the first service information may be used to indicate a time-frequency resource that the third NAN device can use or tends to preferably use, or may be used to indicate a time-frequency resource that the third NAN device does not support or does not tend to preferably use. In this case, a time-frequency resource that the third NAN device uses or tends to preferably use may be determined indirectly according to the time-frequency resource information included in the first service information.

A time in a time-frequency resource included in the first service information may indicate a time period in which the third NAN device operates. A frequency in the time-frequency resource may indicate a carrier frequency used when the third NAN device operates or a channel on which the third NAN device operates.

Likewise, in this embodiment of the present invention, the time-frequency resource information included in the second service information may be used to indicate a time-frequency resource that the second NAN device can use or tends to preferably use, or may be used to indicate a time-frequency resource that the second NAN device does not support or does not tend to preferably use. In this case, a time-frequency resource that the second NAN device uses or tends to preferably use may be determined indirectly according to the time-frequency resource information included in the second service information.

A time in a time-frequency resource included in the second service information may indicate a time period in which the second NAN device operates. A frequency in the time-frequency resource may indicate a carrier frequency used when the second NAN device operates or a channel on which the second NAN device operates.

In this embodiment of the present invention, optionally, the first NAN device itself may determine, in the following manner, the first time-frequency resource information and the second time-frequency resource information based on the relay request message according to at least one of: the time-frequency resource information included in the first service information, the time-frequency resource information included in the second service information, or the information about time-frequency resources supported by the first NAN device:

The first NAN device itself determines, based on the relay request message, the first time-frequency resource information according to the time-frequency resource information included in the first service information and the information about time-frequency resources supported by the first NAN device, and determines the second time-frequency resource information according to the time-frequency resource information included in the second service information and the information about time-frequency resources supported by the first NAN device; or the first NAN device itself determines the first time-frequency resource information and the second time-frequency resource information based on the relay request message according to the time-frequency resource information included in the second service information and the information about time-frequency resources supported by the first NAN device; or the first NAN device itself determines the first time-frequency resource information and the second time-frequency resource information based on the relay request message according to the time-frequency resource information included in the first service information and the information about time-frequency resources supported by the first NAN device; or the first NAN device itself determines the first time-frequency resource information and the second time-frequency resource information based on the relay request message according to the time-frequency resource information included in the first service information and the time-frequency resource information included in the second service information.

In this embodiment of the present invention, optionally, the first NAN device may obtain the first service information of the third NAN device in the following manners:

The first manner is that the first NAN device receives a service registration message sent by the third NAN device, and obtains the first service information from the service registration message.

For example, the third NAN device registers its service information with the first NAN device by using a service registration mechanism, so that the first NAN device obtains the first service information of the third NAN device.

The second manner is that the first NAN device receives a service discovery message sent by the third NAN device, and obtains the first service information from the service discovery message.

For example, the second NAN device sends a service discovery message in a DW of an NAN cluster. The first NAN device receives the service discovery message, and obtains the first service information of the third NAN device from the received service discovery message.

The third manner is that the first NAN device receives a service information notification message sent by the third NAN device, and obtains the first service information from the service information notification message.

In the third manner, before the first NAN device receives the service information notification message, the first NAN device sends a service information request message to the third NAN device, or the third NAN device receives an upper-layer instruction that instructs the third NAN device to send the service information notification message to the first NAN device, so that the first NAN device obtains the first service information of the third NAN device.

The fourth manner is that the first NAN device obtains the first service information of the third NAN device by using an upper-layer application.

Certainly, the four manners are specific implementations of obtaining, by the first NAN device, the first service information of the third NAN device. In actual application, it is not limited to the four manners, and there may be another implementation. Details are not described herein.

In this embodiment of the present invention, optionally, the first NAN device may obtain the second service information of the second NAN device in the following manner:

The first NAN device obtains the second service information from the relay request message; or the first NAN device sends a service discovery message to the second NAN device, receives a service discovery response message sent by the second NAN device, and obtains the second service information from the service discovery response message; or the first NAN device receives a service discovery message sent by the second NAN device, and obtains the second service information from the service discovery message; or the first NAN device obtains the second service information by using an upper-layer application.

In this embodiment of the present invention, before the first NAN device receives the relay request message sent by the second NAN device, the following operations are further included:

The first NAN device receives an SDF subscribe message sent by the second NAN device, where the SDF subscribe message is used to search for a service required by the second NAN device; and the first NAN device sends an SDF publish message to the second NAN device when determining that the service required by the second NAN device matches a service that the third NAN device can provide, where the SDF publish message carries information about the service that the third NAN device can provide.

In this embodiment of the present invention, optionally, the first NAN device may determine the first time-frequency resource information and the second time-frequency resource information according to the relay request message in the following several manners:

The first NAN device receives, according to the relay request message, time-frequency resource information sent by the second NAN device, and determines the first time-frequency resource information and the second time-frequency resource information according to the time-frequency resource information sent by the second NAN device.

In this manner, the time-frequency resource information sent by the second NAN device is time-frequency resource information determined by the second NAN device itself. A manner of determining the time-frequency resource information by the second NAN device itself is the same as the manner of determining the time-frequency resource information by the first NAN device itself. A specific process is as follows:

Before the second NAN device itself determines the time-frequency resource information, the following is further included:

The second NAN device obtains third service information of the third NAN device and/or fourth service information of the first NAN device.

Optionally, the second NAN device itself may determine the time-frequency resource information in the following manner:

The second NAN device itself determines the time-frequency resource information according to the third service information and/or the fourth service information.

Optionally, the second NAN device itself may determine the time-frequency resource information according to the third service information and/or the fourth service information in the following manner:

The second NAN device itself determines the time-frequency resource information according to at least one of: time-frequency resource information included in the third service information, time-frequency resource information included in the fourth service information, or the information about time-frequency resources supported by the first NAN device.

Optionally, the second NAN device itself may determine the time-frequency resource information according to the third service information and/or the fourth service information in the following manner:

The second NAN device itself determines the time-frequency resource information according to first service identifier information included in the third service information and/or second service identifier information corresponding to the NDL link between the second NAN device and the first NAN device.

Optionally, the second NAN device itself may determine the time-frequency resource information according to the third service information and/or the fourth service information in the following manner:

The second NAN device itself determines the time-frequency resource information according to first QoS information included in the third service information and/or second QoS information corresponding to the NDL link between the second NAN device and the first NAN device.

Optionally, the second NAN device itself may determine, in the following manner, the time-frequency resource information according to at least one of: the time-frequency resource information included in the third service information, the time-frequency resource information included in the second service information, or the information about time-frequency resources supported by the first NAN device:

The second NAN device itself determines the time-frequency resource information according to the time-frequency resource information included in the third service information and the information about time-frequency resources supported by the first NAN device; or the second NAN device itself determines the time-frequency resource information according to the time-frequency resource information included in the second service information and the information about time-frequency resources supported by the first NAN device; or the second NAN device itself determines the time-frequency resource information according to the time-frequency resource information included in the third service information and the time-frequency resource information included in the second service information.

Before the second NAN device sends the relay request message to the first NAN device, the following operation is further included:

The second NAN device determines that the second NAN device cannot connect to the third NAN device.

The second NAN device may determine, in the following manner, that the second NAN device cannot connect to the third NAN device:

The second NAN device obtains the third service information of the third NAN device, sends a service discovery message to the third NAN device according to the third service information, and when no service discovery response message sent by the third NAN device is received in preset duration, determines that the second NAN device cannot connect to the third NAN device; or the second NAN device obtains the third service information of the third NAN device, sends a service link connection request message to the third NAN device according to the third service information, and when no service link connection response message sent by the third NAN device is received in preset duration, determines that the second NAN device cannot connect to the third NAN device.

Optionally, the second NAN device may obtain the third service information of the third NAN device in the following manner:

The second NAN device receives the third service information sent by the first NAN device; or the second NAN device receives a service discovery message sent by the third NAN device, and obtains the third service information from the service discovery message; or the second NAN device obtains the third service information by using an upper-layer application.

Before the NAN device sends the relay request message to the first NAN device, the following operation is further included:

The second NAN device obtains device information of the first NAN device.

Optionally, the second NAN device may send the relay request message to the first NAN device in the following manner:

The second NAN device sends the relay request message to the first NAN device according to the device information of the first NAN device.

The second NAN device may obtain the device information of the first NAN device in the following manner:

The second NAN device sends a service discovery message, receives a service discovery response message sent by the first NAN device, and obtains the device information of the first NAN device from the service discovery response message; or the second NAN device obtains the device information of the first NAN device from a service discovery message sent by the first NAN device; or the second NAN device obtains the device information of the first NAN device from a relay request response message sent by the first NAN device; or the second NAN device obtains the device information of the first NAN device by using an upper-layer application.

Optionally, the second NAN device itself may determine the time-frequency resource information according to the third service information and/or the second service information in the following manner:

The second NAN device itself determines the time-frequency resource information according to the first service identifier information included in the third service information and the second service identifier information included in the second service information.

In this embodiment of the present invention, optionally, the first NAN device may determine the first time-frequency resource information and the second time-frequency resource information according to the relay request message in the following several manners:

The first NAN device receives, according to the relay request message, time-frequency resource information sent by the third NAN device, and determines the first time-frequency resource information and the second time-frequency resource information according to the time-frequency resource information sent by the third NAN device.

In this embodiment of the present invention, a manner of determining the time-frequency resource information by the third NAN device itself is the same as the manner of determining the time-frequency resource information by the first NAN device itself. A specific process is as follows:

Before the third NAN device itself determines the time-frequency resource information, the following is further included:

The third NAN device obtains the fourth service information of the first NAN device and/or the second service information of the second NAN device.

Optionally, the third NAN device itself may determine the time-frequency resource information in the following manner:

The third NAN device itself determines the time-frequency resource information according to the fourth service information and/or the second service information.

Optionally, the third NAN device itself may determine the time-frequency resource information according to the fourth service information and/or the second service information in the following manner:

The third NAN device itself determines the time-frequency resource information according to at least one of: the time-frequency resource information included in the fourth service information, the time-frequency resource information included in the second service information, or the information about time-frequency resources supported by the first NAN device.

Optionally, the third NAN device itself may determine the time-frequency resource information according to the fourth service information and/or the second service information in the following manner:

The third NAN device itself determines the time-frequency resource information according to first service identifier information corresponding to the NDL link between the third NAN device and the first NAN device and/or the second service identifier information included in the second service information.

Optionally, the third NAN device itself may determine the time-frequency resource information according to the fourth service information and/or the second service information in the following manner:

The third NAN device itself determines the time-frequency resource information according to first QoS information corresponding to the NDL link between the third NAN device and the first NAN device and/or the second QoS information included in the second service information.

Optionally, the third NAN device itself may determine, in the following manner, the time-frequency resource information according to at least one of: the time-frequency resource information included in the third service information, the time-frequency resource information included in the second service information, or the information about time-frequency resources supported by the first NAN device:

The third NAN device itself determines the time-frequency resource information according to the time-frequency resource information included in the third service information and the information about time-frequency resources supported by the first NAN device; or the third NAN device itself determines the time-frequency resource information according to the time-frequency resource information included in the second service information and the information about time-frequency resources supported by the first NAN device; or the third NAN device itself determines the time-frequency resource information according to the time-frequency resource information included in the third service information and the time-frequency resource information included in the second service information.

In this embodiment of the present invention, optionally, the first NAN device may determine the first time-frequency resource information and the second time-frequency resource information according to the relay request message in the following several manners:

The first NAN device receives, according to the relay request message, the time-frequency resource information sent by the second NAN device, and uses the time-frequency resource information sent by the second NAN device as the first time-frequency resource information; and receives the time-frequency resource information sent by the third NAN device, and uses the received time-frequency resource information as the second time-frequency resource information.

In this embodiment of the present invention, optionally, the time-frequency resource information in the first service information may indicate a sleep rule of the third NAN device, for example, indicate a quantity of DWs or DW intervals in which the third NAN device sleeps, or indicate that the third NAN device sleeps in a time period in a DW interval and operates on a channel in other time periods. In a time period in which the third NAN device sleeps, the first NAN device may perform service discovery instead of the third NAN device. In a time period in which the third NAN device operates, the first NAN device notifies the third NAN device of information about a second NAN device that meets a service requirement, so that the third NAN device shakes hands with the second NAN device in the time period in which the third NAN device operates. Alternatively, when performing service discovery instead of the third NAN device, the first NAN device notifies the second NAN device of the time-frequency resource information of the third NAN device, so that the second NAN device shakes hands with the third NAN device in the time period in which the third NAN device operates.

Alternatively, the time-frequency resource information of the third NAN device may indicate information about a time period and frequency used when the third NAN device runs a service indicated by the service identifier information. For example, the information about the time period and the frequency used when the third NAN device runs the service indicated by the service identifier information is indicated in a bitmap form. A first dimension of a bitmap is time information. If a minimum duration unit for operation of an NAN device on a channel is 16 TUs (Time Unit, time unit), one DW interval (including 496 TUs in total) is divided into 31 minimum duration units. In the 16 TUs, if the NAN device is not in a sleep state, it needs to operate on a channel and can switch to another channel for operation only after the 16 TUs end. A second dimension of the bitmap is channel information, that is, information about a channel on which a first device operates. A bitmap (bitmap) corresponding to a channel and a minimum unit is set to 1 to indicate that the device operates on the channel in a time period indicated by the minimum unit. A bitmap corresponding to a channel and a minimum unit is set to 0 or left blank to indicate that the device is in a sleep state in a time period indicated by the minimum unit.

In this embodiment of the present invention, optionally, a bitmap may be shown in Table 1. For ease of expression, only channels 1, 6, and 11 are marked for illustration. It should be noted that, in an actual NAN system, channels 1 to 11 (13) are usually marked in a bitmap. This indicates that the NAN device may operate on any one of the 11 channels in a timeslot.

In the following example for describing determining of the first time-frequency resource and the second time-frequency resource, an NAN device may operate on channels 1, 6, and 11. Table 1 lists time-frequency resources supported by the first NAN device. Table 2 lists time-frequency resources supported by the second NAN device. Table 3 lists overlapping time-frequency resources in the time-frequency resources supported by the first NAN device and the time-frequency resources supported by the second NAN device. In this example, the overlapping time-frequency resources are used as the first time-frequency resource and the second time-frequency resource.

TABLE 1

| Channel Number | Duration of Minimum Time Unit | Available Time-Frequency Bitmap | | | | | | | | | | | | | | | |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 1 | 16 TUs | | | | | | | | | | | | | | | | |
| 6 | 16 TUs | 1 | 1 | 1 | 1 | 1 | 1 | | | | | | | | | | |
| 11 | 16 TUs | | | | | | | 1 | 1 | 1 | 1 | 1 | 1 | 1 | 1 | 1 | 1 |

TABLE 1-continued

Time-frequency resources supported by the first NAN device

| Channel Number | Duration of Minimum Time Unit | Available Time-Frequency Bitmap | | | | | | | | | | | | | | | |
| --- | --- | --- | --- | --- | --- | --- | --- | --- | --- | --- | --- | --- | --- | --- | --- | --- | --- |
| | | 16 | 17 | 18 | 19 | 20 | 21 | 22 | 23 | 24 | 25 | 26 | 27 | 28 | 29 | 30 | 31 |
| 1 | 16 TUs | | | | | | 1 | 1 | 1 | 1 | 1 | 1 | 1 | 1 | 1 | 1 | 1 |
| 6 | 16 TUs | | | | | | | | | | | | | | | | |
| 11 | 16 TUs | 1 | 1 | 1 | 1 | 1 | | | | | | | | | | | |

TABLE 2

Time-frequency resources supported by the second NAN device

| Channel Number | Duration of Minimum Time Unit | Available Time-Frequency Bitmap | | | | | | | | | | | | | | | |
| --- | --- | --- | --- | --- | --- | --- | --- | --- | --- | --- | --- | --- | --- | --- | --- | --- | --- |
| | | 0 | 1 | 2 | 3 | 4 | 5 | 6 | 7 | 8 | 9 | 10 | 11 | 12 | 13 | 14 | 15 |
| 1 | 16 TUs | | | | | | | | | | | | | | | | |
| 6 | 16 TUs | 1 | 1 | 1 | 1 | 1 | 1 | | | | | | | | | | |
| 11 | 16 TUs | | | | | | | | 1 | 1 | 1 | 1 | 1 | 1 | 1 | 1 | 1 |

| Channel Number | Duration of Minimum Time Unit | Available Time-Frequency Bitmap | | | | | | | | | | | | | | | |
| --- | --- | --- | --- | --- | --- | --- | --- | --- | --- | --- | --- | --- | --- | --- | --- | --- | --- |
| | | 16 | 17 | 18 | 19 | 20 | 21 | 22 | 23 | 24 | 25 | 26 | 27 | 28 | 29 | 30 | 31 |
| 1 | 16 TUs | | 1 | 1 | 1 | 1 | 1 | 1 | 1 | 1 | 1 | 1 | 1 | 1 | 1 | 1 | 1 |
| 6 | 16 TUs | | | | | | | | | | | | | | | | |
| 11 | 16 TUs | 1 | | | | | | | | | | | | | | | |

TABLE 3

First-time frequency resource and second time-frequency resource

| Channel Number | Duration of Minimum Time Unit | Available Time-Frequency Bitmap | | | | | | | | | | | | | | | |
| --- | --- | --- | --- | --- | --- | --- | --- | --- | --- | --- | --- | --- | --- | --- | --- | --- | --- |
| | | 0 | 1 | 2 | 3 | 4 | 5 | 6 | 7 | 8 | 9 | 10 | 11 | 12 | 13 | 14 | 15 |
| 1 | 16 TUs | | | | | | | | | | | | | | | | |
| 6 | 16 TUs | | 1 | 1 | 1 | 1 | 1 | 1 | | | | | | | | | |
| 11 | 16 TUs | | | | | | | | 1 | 1 | 1 | 1 | 1 | 1 | 1 | 1 | 1 |

TABLE 3-continued

| First-time frequency resource and second time-frequency resource | | | | | | | | | | | | | | | | | | |
|---|---|---|---|---|---|---|---|---|---|---|---|---|---|---|---|---|---|---|
| Channel Number | Duration of Minimum Time Unit | Available Time-Frequency Bitmap | | | | | | | | | | | | | | | | |
| | | 16 | 17 | 18 | 19 | 20 | 21 | 22 | 23 | 24 | 25 | 26 | 27 | 28 | 29 | 30 | 31 |
| 1 | 16 TUs | | | | | | 1 | 1 | 1 | 1 | 1 | 1 | 1 | 1 | 1 | 1 | 1 |
| 6 | 16 TUs | | | | | | | | | | | | | | | | | |
| 11 | 16 TUs | 1 | | | | | | | | | | | | | | | | |

In this embodiment of the present invention, the first NAN device determines the first time-frequency resource information and the second time-frequency resource information according to the relay request message. The first NAN device establishes, with the second NAN device, the first NDL that uses the first time-frequency resource information, and establishes, with the third NAN device, the second NDL that uses the second time-frequency resource information.

In this embodiment of the present invention, service data of the second NAN device and the third NAN device may be forwarded by using the first NDL and the second NDL, so that data is successfully transmitted between the second NAN device and the third NAN device. Optionally, the service data may be data for establishing an authentication connection between the second NAN device and the third NAN device or service content data of the second NAN device and the third NAN device. This is not specifically limited herein.

It should be noted that, a time sequence of unassociated steps is not specifically limited in this embodiment of the present invention. For example, in a specific implementation, that the first NAN device establishes, with the second NAN device, the first NDL that uses the first time-frequency resource information, and establishes, with the third NAN device, the second NDL that uses the second time-frequency resource information described in step 220 may be that the first NAN device first establishes, with the second NAN device, the first NDL that uses the first time-frequency resource information, and then establishes, with the third NAN device, the second NDF that uses the second time-frequency resource information; or may be that the first NAN device first establishes, with the third NAN device, the second NDL that uses the second time-frequency resource information, and then establishes, with the second NAN device, the first NDL that uses the first time-frequency resource information.

Figure 3:
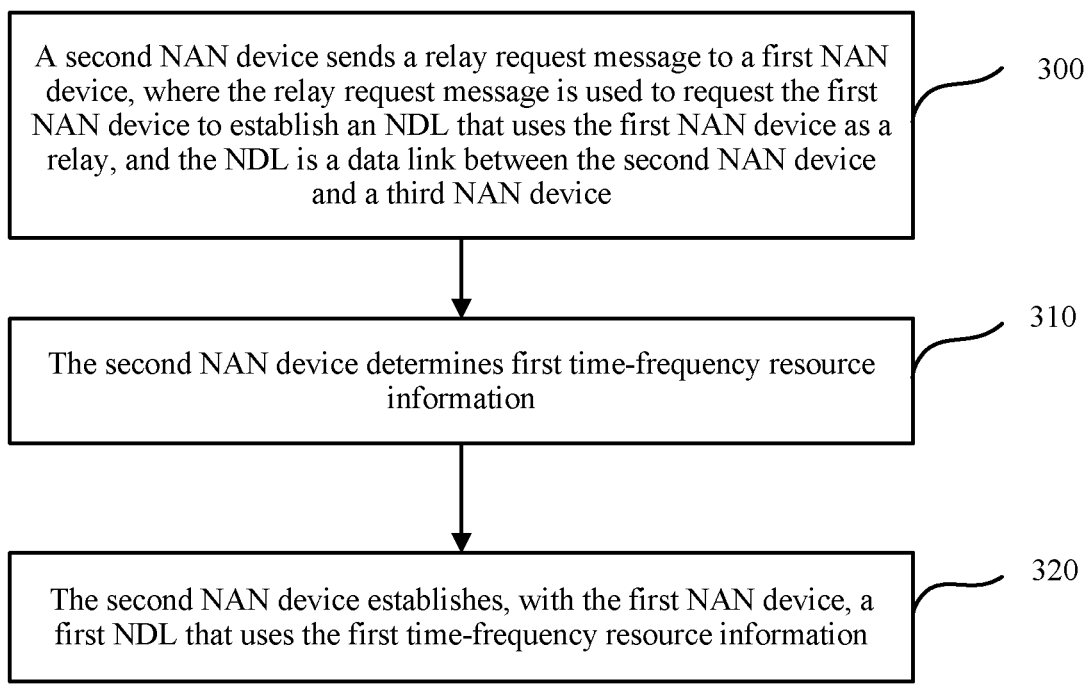
FIG. 3 is another flowchart of data link establishment according to an embodiment of the present invention.

As shown in FIG. 3, in an embodiment of the present invention, another data link establishment procedure is as follows:

Step 300: A second NAN device sends a relay request message to a first NAN device, where the relay request message is used to request the first NAN device to establish an NDL that uses the first NAN device as a relay, and the NDL is a data link between the second NAN device and a third NAN device.

Step 310: The second NAN device determines first time-frequency resource information.

Step 320: The second NAN device establishes, with the first NAN device, a first NDL that uses the first time-frequency resource information.

In this embodiment of the present invention, a time sequence of step 300 and step 310 is not specifically limited. That is, step 300 may be performed first, and then step 310 is performed; or step 310 may be performed first, and then step 300 is performed.

In this embodiment of the present invention, optionally, the second NAN device may determine the first time-frequency resource information in the following manner:

The second NAN device itself determines the first time-frequency resource information; or the second NAN device receives time-frequency resource information sent by the first NAN device, and uses the time-frequency resource information sent by the first NAN device as the first time-frequency resource information.

Further, before the second NAN device itself determines the first time-frequency resource information, the following operation is further included:

The second NAN device obtains third service information of the third NAN device and/or second service information of the second NAN device.

The second NAN device itself may determine the first time-frequency resource information in the following manner:

The second NAN device itself determines the first time-frequency resource information according to the third service information and/or the second service information.

In this embodiment of the present invention, a time sequence of obtaining, by the second NAN device, the third service information of the third NAN device and/or the second service information of the second NAN device and sending, by the second NAN device, the relay request message to the first NAN device is not specifically limited. For example, the second NAN device may first obtain the third service information of the third NAN device and/or the second service information of the second NAN device, and then send the relay request message to the first NAN device. Alternatively, the second NAN device may first send the relay request message to the first NAN device, and then obtain the third service information of the third NAN device and/or the second service information of the second NAN device.

In this embodiment of the present invention, the second NAN device itself may determine the first time-frequency resource information according to the third service information and/or the second service information in the following manner:

The second NAN device itself determines the first time-frequency resource information according to at least one of: time-frequency resource information included in the third service information, time-frequency resource information included in the second service information, or information about time-frequency resources supported by the first NAN device; or the second NAN device itself determines the first time-frequency resource information according to first service identifier information included in the third service information and second service identifier information included in the second service information.

In this embodiment of the present invention, when the second NAN device itself determines the first time-frequency resource information according to the first service identifier information included in the third service information and the second service identifier information included in the second service information, a possible manner is: converting service identifier information to obtain a numerical result, and determining a first time-frequency resource according to the numerical result with reference to a preset correspondence between numerical values and time-frequency resources. Certainly, it is not limited to the foregoing implementation. Details are not described herein.

For example, a numerical value is obtained after SHA-1 or SHA-256 algorithm hashing is performed on the service identifier information and then three least significant bits are clipped out and converted into a decimal value. A corresponding time-frequency resource set is determined in the correspondence between numerical values and time-frequency resources according to the data value. Then the first time-frequency resource is determined in the time-frequency resource set.

In this embodiment of the present invention, optionally, a first service identifier is used to represent a service that the third NAN device can provide, support, subscribe to, or publish; a second service identifier is used to represent a service that the second NAN device can provide, support, subscribe to, or publish.

In this embodiment of the present invention, the second NAN device itself may determine the first time-frequency resource information according to the third service information and/or the second service information in the following manner:

The second NAN device itself determines the first time-frequency resource information according to first QoS information included in the third service information and/or second QoS information included in the second service information.

In this embodiment of the present invention, when the second NAN device itself determines the first time-frequency resource information according to the first QoS information included in the third service information and/or the second QoS information included in the second service information, the second NAN device itself may determine the first time-frequency resource information according to the first QoS information; or determine the first time-frequency resource information according to the first QoS information and the second QoS information; or select one piece of QoS information from the first QoS information and the second QoS information, and determine the first time-frequency resource information according to the selected QoS information.

In this embodiment of the present invention, service information carries QoS information in a plurality of manners. For example, refer to an EDCA mechanism specified in IEEE 802.11. In the EDCA mechanism, services indicated by QoS information are classified into four categories: AC_BK, AC_BE, AC_VI, and AC_VO. Because the service categories require different transmission delays, when the service information carries the QoS information, time-frequency resources may be scheduled according to a QoS category indicating the service. Alternatively, the QoS information may be expressed by using TSPEC elements in IEEE 802.11. A structure of the TSPEC elements is shown in FIG. 2B. The service information may carry all elements in FIG. 2B, or may carry some elements in FIG. 2B, for example, carry a minimum data transmission rate, an average data transmission rate, a peak data transmission rate, or a traffic burst size, or certainly may carry other elements in FIG. 2B, for example, carry at least one of a maximum service interval, a minimum service interval, a maximum data transmission rate, a minimum data transmission rate, an average data transmission rate, a maximum packet transmission time, a preferred packet transmission time, a maximum transmission delay, a preferred data transmission delay, or a burst data packet size. In this case, in other words, QoS may indicate at least one of the maximum service interval, the minimum service interval, the maximum data transmission rate, the minimum data transmission rate, the average data transmission rate, the maximum packet transmission time, the preferred packet transmission time, the maximum transmission delay, the preferred data transmission delay, the burst data packet size, or the like that is required for ensuring user experience. Certainly, content indicated by the QoS may not be specifically limited herein.

In this embodiment of the present invention, when the second NAN device itself determines the first time-frequency resource information according to the third service information and/or the second service information, the second NAN device itself may determine the first time-frequency resource information by using at least one of: the time-frequency resource information, the service identifier information, or the QoS information included in the third service information and/or the second service information.

It should be noted that, different services require different quality of service. For example, a real-time audio service requires a relatively high average data transmission rate to ensure smooth audio presentation; a text service requires only a relatively low minimum data transmission rate. The QoS may be expressed by using a specific value, or may be expressed by using a preset category. This is not specifically limited in the present invention.

According to the foregoing description, when the second NAN device itself determines the first time-frequency resource information according to the third service information and/or the second service information, the second NAN device itself determines the first time-frequency resource information according to the time-frequency resource information included in the third service information and/or the second service information; or determines the first time-frequency resource information according to the service identifier information included in the third service information and/or the second service information; or determines the first time-frequency resource information according to the QoS information included in the third service information and/or the second service information.

That is, in this embodiment of the present invention, when the second NAN device itself determines the first time-frequency resource information according to the third service information and/or the second service information, the second NAN device itself may determine the first time-frequency resource information by using at least one of: the time-frequency resource information, the service identifier information, or the QoS information included in the third service information and/or the second service information.

In this embodiment of the present invention, the second NAN device itself may determine, in the following manner, the first time-frequency resource information according to at least one of: the time-frequency resource information included in the third service information, the time-frequency resource information included in the second service information, or the information about time-frequency resources supported by the first NAN device:

The second NAN device itself determines the first time-frequency resource information according to the time-frequency resource information included in the third service information and the information about time-frequency resources supported by the first NAN device; or the second NAN device itself determines the first time-frequency resource information according to the time-frequency resource information included in the second service information and the information about time-frequency resources supported by the first NAN device; or the second NAN device itself determines the first time-frequency resource information according to the time-frequency resource information included in the third service information and the time-frequency resource information included in the second service information.

For example, an overlapping part between a time-frequency resource of the second NAN device and an available time-frequency resource of the first NAN device itself is used as the first time-frequency resource. Alternatively, an overlapping part between a time-frequency resource of the third NAN device and the available time-frequency resource of the first NAN device itself is used as the first time-frequency resource. Alternatively, an overlapping part among the time-frequency resource of the third NAN device, the time-frequency resource of the second NAN device, and the available time-frequency resource of the first NAN device itself may be used as the first time-frequency resource.

In this embodiment of the present invention, the time-frequency resource information included in the third service information may be used to indicate a time-frequency resource that the third NAN device can use or tends to preferably use, or may be used to indicate a time-frequency resource that the third NAN device does not support or does not tend to preferably use. In this case, a time-frequency resource that the third NAN device uses or tends to preferably use may be determined indirectly according to the time-frequency resource information included in the third service information.

A time in a time-frequency resource included in the first service information may indicate a time period in which the third NAN device operates. A frequency in the time-frequency resource may indicate a carrier frequency used when the third NAN device operates or a channel on which the third NAN device operates.

Likewise, in this embodiment of the present invention, the time-frequency resource information included in the second service information may be used to indicate a time-frequency resource that the second NAN device can use or tends to preferably use, or may be used to indicate a time-frequency resource that the second NAN device does not support or does not tend to preferably use. In this case, a time-frequency resource that the second NAN device uses or tends to preferably use may be determined indirectly according to the time-frequency resource information included in the second service information.

A time in a time-frequency resource included in the second service information may indicate a time period in which the second NAN device operates. A frequency in the time-frequency resource may indicate a carrier frequency used when the second NAN device operates or a channel on which the second NAN device operates.

Further, the first NAN device may negotiate with the second NAN device to determine a final time-frequency resource.

For example, the first NAN device sends a preferred time-frequency resource of the first NAN device to the second NAN device, and uses the preferred time-frequency resource as the final time-frequency resource. If the second NAN device agrees to accept the time-frequency resource, in this case, the time-frequency resource may be used as a final first time-frequency resource and/or a final second time-frequency resource.

For another example, the second NAN device sends a preferred time-frequency resource of the second NAN device to the first NAN device, and uses the preferred time-frequency resource as the final time-frequency resource. If the first NAN device agrees to accept the time-frequency resource, in this case, the time-frequency resource may be used as a final first time-frequency resource and/or a final second time-frequency resource.

It should be noted that the finally determined time-frequency resource may be consistent with an overlapping time-frequency resource, or may be inconsistent with the overlapping time-frequency resource. This is not specifically limited herein.

Before the second NAN device sends the relay request message to the first NAN device, the following operation is further included:

The second NAN device determines that the second NAN device cannot connect to the third NAN device.

Optionally, the second NAN device may determine, in the following manner, that the second NAN device cannot connect to the third NAN device:

The second NAN device obtains the third service information of the third NAN device, sends a service discovery message to the third NAN device according to the third service information, and when no service discovery response message sent by the third NAN device is received in preset duration, determines that the second NAN device cannot connect to the third NAN device; or the second NAN device obtains the third service information of the third NAN device, sends a service link connection request message to the third NAN device according to the third service information, and when no service link connection response message sent by the third NAN device is received in preset duration, determines that the second NAN device cannot connect to the third NAN device; or after obtaining the third service information of the third NAN device, the second NAN device sends a service discovery message on a channel of the third NAN device in a DW agreed in an NAN cluster, or sends a service link connection request message to the third NAN device, and if no response message is received from the third NAN device in a time period, the second NAN device determines that the second NAN device cannot connect to the third NAN device.

When sending the service discovery message to the third NAN device according to the third service information, the second NAN device may determine, according to the time-frequency resource information of the third NAN device, a time period in which and a channel on which the third NAN device operates, and send the service discovery message to the third NAN device on the channel in the time period.

Likewise, when sending the service link connection request message to the third NAN device according to the third service information, the second NAN device may determine, according to the time-frequency resource information of the third NAN device, the time period in which and the channel on which the third NAN device operates, and send the service link connection request message to the third NAN device on the channel in the time period. In this embodiment of the present invention, the second NAN device may obtain the third service information of the third NAN device in the following manner:

The second NAN device receives the third service information sent by the first NAN device.

Before this, the third NAN device registers its first service information with the first NAN device. In this way, when the third NAN device enters a sleep time period, the first NAN device, instead of the third NAN device, may perform service discovery and send a service discovery message, for example, send a service publish message or a service subscribe message, and wait for another device to receive. Therefore, the second NAN device may obtain the third service information of the third NAN device by receiving the service discovery message from the first NAN device.

Alternatively, the following manner may be used:

The second NAN device receives a service discovery message sent by the third NAN device, and obtains the third service information from the service discovery message; or the second NAN device obtains the third service information by using an upper-layer application.

For example, the second NAN device runs a same application as the third NAN device, and obtains the third service information of the third NAN device by using an application server of the application. If a user views the third NAN device in the application on the second NAN device and selects the third NAN device, the application server sends the third service information of the third NAN device to the second NAN device, so that the second NAN device obtains the third service information of the third NAN device.

The second NAN device may alternatively obtain the third service information of the third NAN device in the following manner: The first NAN device receives a service discovery message from the second NAN device; when a service requirement carried in the service discovery message matches a service of the third NAN device, the first NAN device returns a service discovery response message to the second NAN device, and adds the third service information of the third NAN device to the service discovery response message, so that the second NAN device obtains the third service information of the third NAN device.

In this embodiment of the present invention, before the NAN device sends the relay request message to the first NAN device, the following operation is further included:

The second NAN device obtains device information of the first NAN device.

That the second NAN device sends the relay request message to the first NAN device includes:

The second NAN device sends the relay request message to the first NAN device according to the device information of the first NAN device.

In this embodiment of the present invention, optionally, the second NAN device may obtain the device information of the first NAN device in the following manner:

The second NAN device sends a service discovery message, receives a service discovery response message sent by the first NAN device, and obtains the device information of the first NAN device from the service discovery response message.

For example, the third NAN device registers service information with the first NAN device. The second NAN device obtains the device information of the first NAN device by receiving a service discovery message sent by the first NAN device.

Alternatively, the second NAN device obtains the device information of the first NAN device from a service discovery message sent by the first NAN device; or the second NAN device obtains the device information of the first NAN device from a relay request response message sent by the first NAN device; or the second NAN device obtains the device information of the first NAN device by using an upper-layer application.

For example, the second NAN device initiates a request to a server to establish an NDL with the third NAN device by using a relay. The server determines, by analyzing location data or distance data, that the first NAN device is within transmission ranges of the second NAN device and the third NAN device, and sends the device information of the first NAN device to the second NAN device, so that the second NAN device obtains the device information of the first NAN device.

In this embodiment of the present invention, the device information of the first NAN device includes at least device identifier information of the first NAN device, such as a MAC (Media Access Control, media access control) address or a local address.

In this embodiment of the present invention, it should be noted that the first NAN device may be an NPS or an NPC, or may be certainly the NAN device mentioned in the BACKGROUND. Certainly, the NPS and the NPC are also NAN devices, but they play different roles.

For better understanding of the embodiments of the present invention, a specific application scenario is provided in the following to further describe a data link establishment process in detail.

In this embodiment, a third device is an NPC, a first device is an NPS, and a second device is an NAN device. It should be noted that both the NPC and the NPS are NAN devices, but the NPC and the NPS play different roles because they perform a corresponding registration or proxy behavior.

Figure 4A:
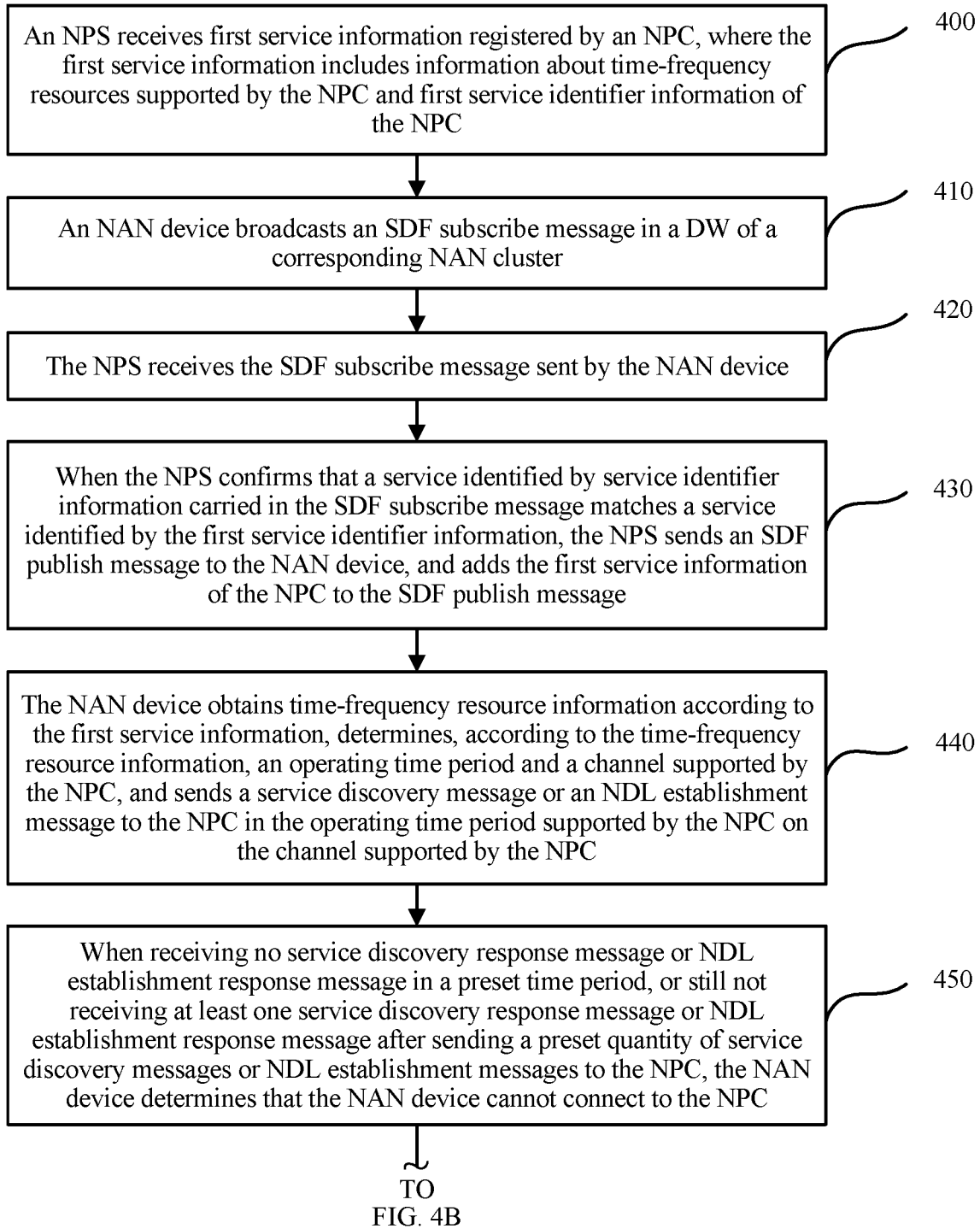
FIG. 4A and FIG. 4B show an embodiment of data link establishment according to an embodiment of the present invention.
Figure 4B:
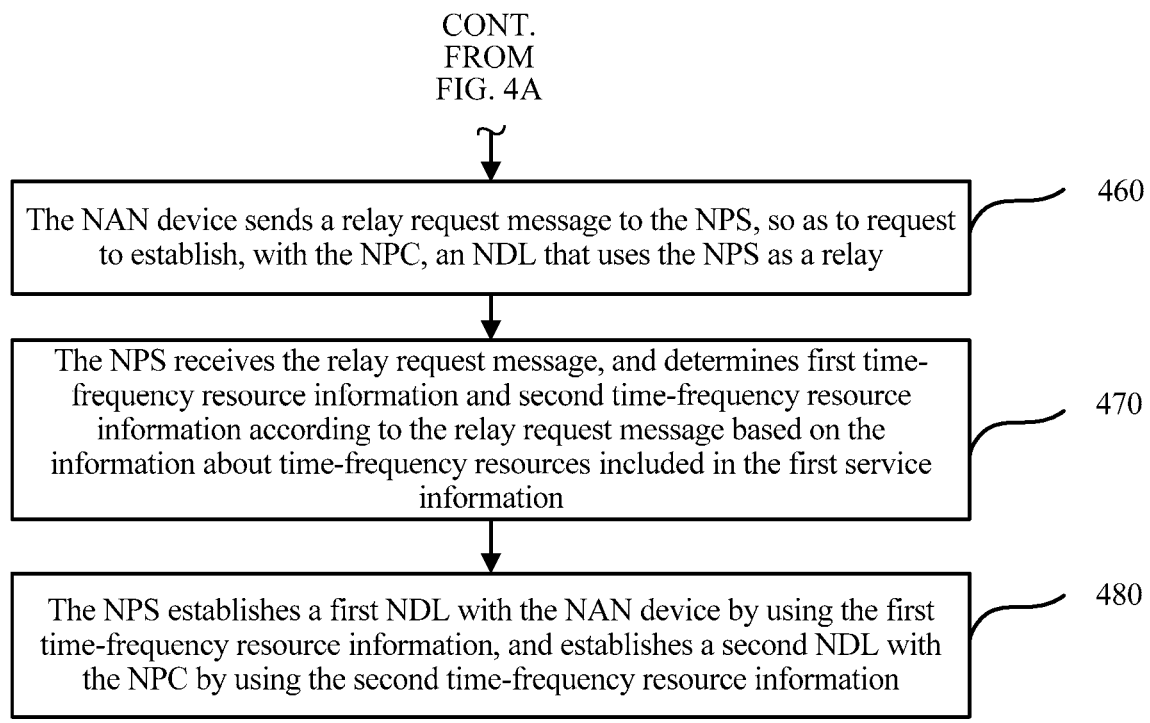

Embodiment 1 is shown in FIG. 4A and FIG. 4B.

Step 400: An NPS receives first service information registered by an NPC, where the first service information includes information about time-frequency resources supported by the NPC and first service identifier information of the NPC.

In this step, the information about time-frequency resources supported by the NPC may indicate a sleep rule of the NPC, for example, indicate a quantity of DWs or DW intervals in which the NPC sleeps, or indicate that the NPC sleeps in a time period in a DW interval and operates on a channel in other time periods. In this way, in a time period in which the NPC sleeps, the NPS may perform service discovery instead of the NPC. In a time period in which the NPC operates, the NPS notifies the NPC of information about an NAN device that meets a service requirement, so that when performing service discovery instead of the NPC, the NPS notifies the NAN device of the information about time-frequency resources supported by the NPC. In this way, the NAN device may shake hands with the NPC in the time period in which the NPC operates. Alternatively, the information about time-frequency resources supported by the NPC may indicate information about a time period and frequency that may be used when the NPC runs a service identified by a service identifier. In this case, the information about time-frequency resources supported by the NPC may be indicated in a bitmap form. A first dimension of a bitmap is time information. That is, a DW interval is divided into 16 TUs, which are a minimum unit for operation of the NPC on a channel. In these 16 TUs, if the NPC is not in a sleep state, it needs to operate on a channel and can switch to another channel for operation only after the 16 TUs ends. A second dimension of the bitmap is channel information, that is, information about a channel on which the NPC operates. A bitmap (bitmap) corresponding to a channel and a minimum unit is set to 1 to indicate that the NPC operates on the channel in a time period indicated by the minimum unit. A bitmap corresponding to a channel and a minimum unit is set to 0 or left blank to indicate that the NPC is in a sleep state in a time period indicated by the minimum unit.

Step 410: An NAN device broadcasts an SDF subscribe message in a DW of a corresponding NAN cluster.

The NAN device needs to search for a service corresponding to the first service identifier information. Then, in this step, the NAN device adds second service identifier information to the broadcast SDF subscribe message. Optionally, the first service identifier information and the second service identifier information are the same or represent a same service.

It should be noted that, to improve security, a transmit end may further convert service identifier information and send converted service identifier information. In this case, when receiving the converted service identifier information, a receive end performs matching on the received service identifier information. There are a plurality of matching manners. Optionally, a matching manner may be as follows: The receive end converts, by using a conversion rule agreed on with the transmit end, service identifier information corresponding to a service that the receive end can provide, so as to obtain converted service identifier information of the receive end; and then when determining that the converted service identifier information of the receive end is the same as the received service identifier information, determines that the received service identifier information is matched.

For example, the transmit end may convert, with reference to time information, the service identifier information to be sent, and send the converted service identifier information. When receiving the converted service identifier information, the receive end performs matching on the received service identifier information. There are a plurality of matching manners. One matching manner is as follows: The receive end converts, with reference to the time information by using the conversion rule agreed on with the transmit end, the service identifier information corresponding to the service that the receive end can provide, so as to obtain the converted service identifier information of the receive end; and then when determining that the converted service identifier information of the receive end is the same as the received service identifier information, determines that the received service identifier information is matched.

It should be noted that a service identified by the converted service identifier information is the same as a service identified by the service identifier information before the conversion. Further, the NAN device may add time-frequency resource information of the NAN device to the SDF subscribe message.

Step 420: The NPS receives the SDF subscribe message sent by the NAN device.

Step 430: When the NPS confirms that a service identified by service identifier information carried in the SDF subscribe message matches a service identified by the first service identifier information, the NPS sends an SDF publish message to the NAN device, and adds the first service information of the NPC to the SDF publish message.

The matching in this step may mean that the service identified by the service identifier information carried in the SDF subscribe message is the same as the service identified by a first service identifier.

Step 440: The NAN device obtains time-frequency resource information according to the first service information, determines, according to the time-frequency resource information, an operating time period and a channel supported by the NPC, and sends a service discovery message or an NDL establishment message to the NPC in the operating time period supported by the NPC on the channel supported by the NPC.

In this step, when the NAN device sends the service discovery message or the NDL establishment message to the NPC according to the operating time period and the channel that are supported by the NPC and indicated by the time-frequency resource information, the NAN device may alternatively send the service discovery message or the NDL establishment message to the NPC in a DW in the operating time period of the NPC according to a sleep rule of the NPC, where the sleep rule is indicated by the time-frequency resource information.

In this step, the service discovery message or the NDL establishment message may be sent in a unicast or broadcast manner. The service discovery message may be specifically an SDF message in NAN, for example, an SDF subscribe message or an SDF message that is used for requesting session establishment. The NDL establishment message may be a defined message used to trigger the NPC to perform NDL establishment.

Step 450: When receiving no service discovery response message or NDL establishment response message in a preset time period, or still not receiving at least one service discovery response message or NDL establishment response message after sending a preset quantity of service discovery messages or NDL establishment messages to the NPC, the NAN device determines that the NAN device cannot connect to the NPC.

Step 460: The NAN device sends a relay request message to the NPS, so as to request to establish, with the NPC, an NDL that uses the NPS as a relay.

In this step, the NAN device may further add second service information of the NAN device to the relay request message. The second service information includes time-frequency resource information.

Step 470: The NPS receives the relay request message, and determines first time-frequency resource information and second time-frequency resource information according to the relay request message based on the information about time-frequency resources included in the first service information.

In this step, when determining the first time-frequency resource information and the second time-frequency resource information according to the information about time-frequency resources carried in the first service information, the NPS may determine the first time-frequency resource information and the second time-frequency resource information directly according to the time-frequency resource information carried in the first service information, for example, directly use the time-frequency resource information carried in the first service information as the first time-frequency resource information and the second time-frequency resource information.

Alternatively, the NPS may determine the first time-frequency resource information and the second time-frequency resource information according to the information about time-frequency resources carried in the first service information and time-frequency resources supported by the NPS.

For example, an overlapping time-frequency resource between the information about time-frequency resources carried in the first service information and the time-frequency resources supported by the NPS is used as the first time-frequency resource information and the second time-frequency resource information.

Alternatively, the NPS may determine the first time-frequency resource information and the second time-frequency resource information according to the information about time-frequency resources carried in the first service information, the time-frequency resource information carried in the second service information, and the time-frequency resources supported by the NPS.

For example, an overlapping time-frequency resource between the information about time-frequency resources carried in the first service information and the time-frequency resources supported by the NPS is used as the second time-frequency resource information, and an overlapping time-frequency resource between the time-frequency resource information carried in the second service information and the time-frequency resources supported by the NPS is used as the first time-frequency resource information. Alternatively, an overlapping time-frequency resource among the information about time-frequency resources carried in the first service information, the time-frequency resource information carried in the second service information, and the time-frequency resources supported by the NPS is used as the first time-frequency resource information and the second time-frequency resource information. In this case, the first time-frequency resource information is the same as the second time-frequency resource information.

Step 480: The NPS establishes a first NDL with the NAN device by using the first time-frequency resource information, and establishes a second NDL with the NPC by using the second time-frequency resource information.

According to the description in step 470 in Embodiment 1, the first time-frequency resource information and the second time-frequency resource information are determined based on the information about time-frequency resources included in the first service information. Certainly, the first time-frequency resource information and the second time-frequency resource information may be alternatively determined based on the information about time-frequency resources included in the first service information and the time-frequency resource information included in the second service information. That is, when other steps are the same, step 470 may be alternatively described as follows:

The NPS receives the relay request message, and determines first time-frequency resource information and second time-frequency resource information according to the relay request message based on the information about time-frequency resources included in the first service information and time-frequency resource information included in second service information.

Alternatively, the NPS receives the relay request message, determines second time-frequency resource information according to the relay request message based on the information about time-frequency resources included in the first service information and information about time-frequency resources supported by the NPS, and determines first time-frequency resource information according to time-frequency resource information included in second service information and the information about time-frequency resources supported by the NPS.

When determining the first time-frequency resource information and the second time-frequency resource information, the first NAN device may further negotiate with the second NAN device to determine a final time-frequency resource.

For example, the first NAN device sends a preferred time-frequency resource of the first NAN device to the second NAN device, and uses the preferred time-frequency resource as the final time-frequency resource. If the second NAN device agrees to accept the time-frequency resource, in this case, the time-frequency resource may be used as a final first time-frequency resource and/or a final second time-frequency resource.

For another example, the second NAN device sends a preferred time-frequency resource of the second NAN device to the first NAN device, and uses the preferred time-frequency resource as the final time-frequency resource. If the first NAN device agrees to accept the time-frequency resource, in this case, the time-frequency resource may be used as a final first time-frequency resource and/or a final second time-frequency resource.

It should be noted that the finally determined time-frequency resource may be consistent with an overlapping time-frequency resource, or may be inconsistent with the overlapping time-frequency resource. This is not specifically limited herein.

A time sequence of the steps in Embodiment 1 is not specifically limited if the steps are not directly associated with each other. For example, step 400 is not directly associated with step 410. Therefore, step 400 may be performed first, and then step 410 is performed; or step 410 may be performed first, and then step 400 is performed. Cases of other steps are similar. Details are not described herein.

According to the description in Embodiment 1, the first time-frequency resource information and the second time-frequency resource information are determined according to a time-frequency resource included in service information. In an embodiment of the present invention, the first time-frequency resource information and the second time-frequency resource information may be alternatively determined according to QoS information.

Figure 5A:
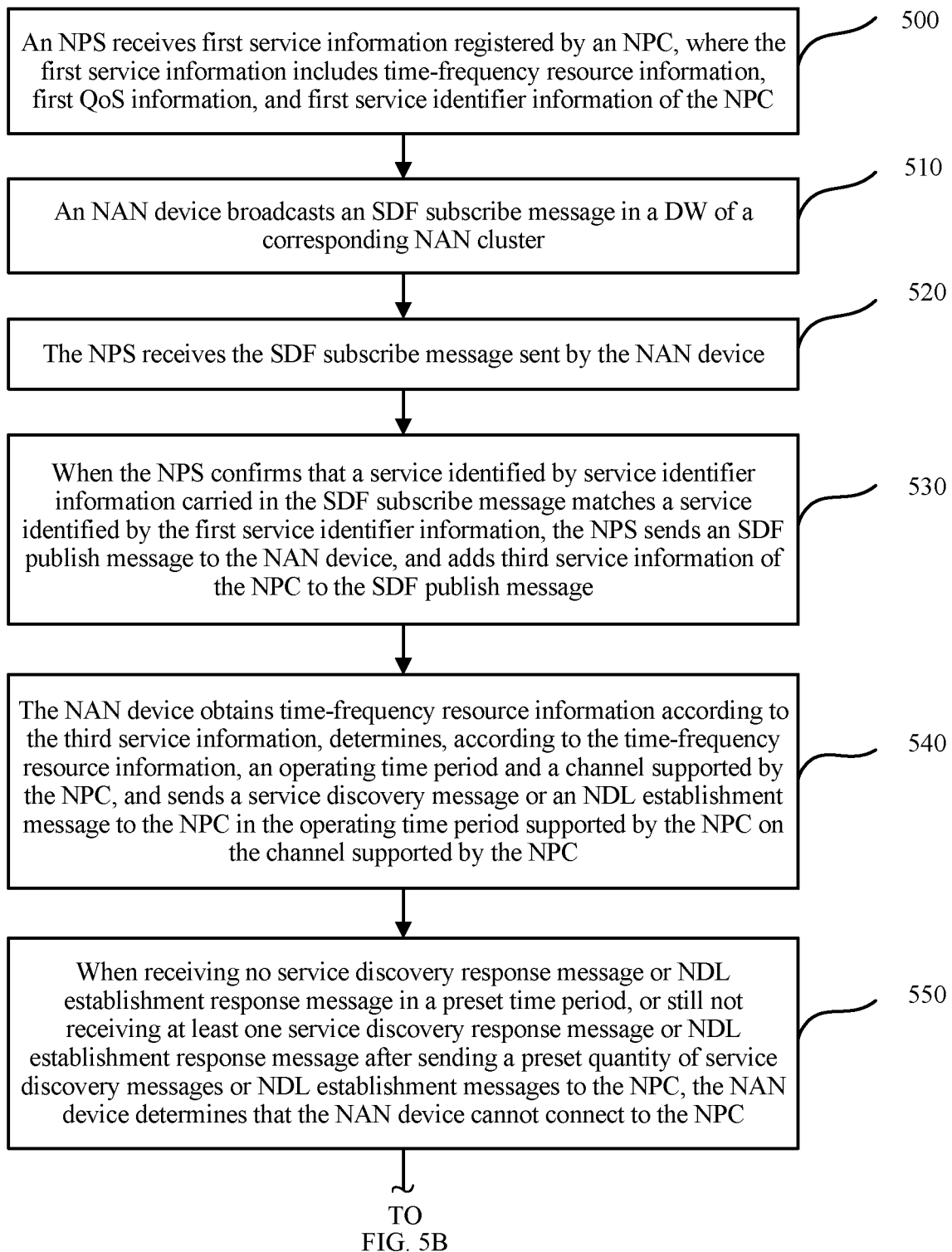
FIG. 5A and FIG. 5B show another embodiment of data link establishment according to an embodiment of the present invention.
Figure 5B:
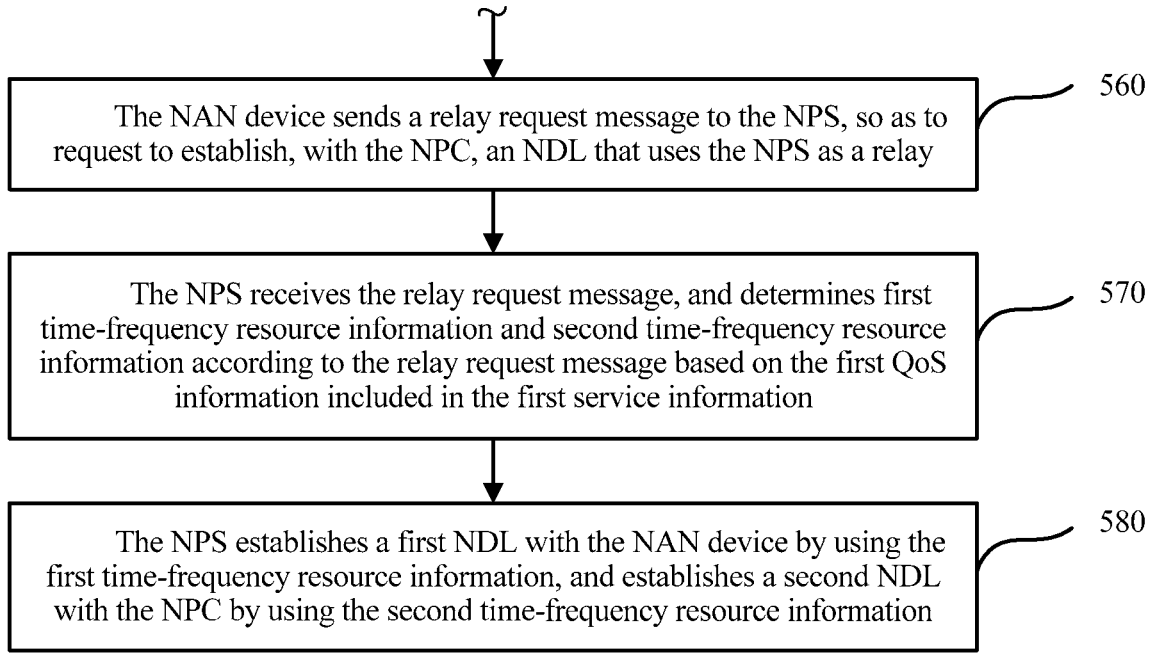

Embodiment 2 is shown in FIG. 5A and FIG. 5B.

Step 500: An NPS receives first service information registered by an NPC, where the first service information includes time-frequency resource information, first QoS information, and first service identifier information of the NPC.

In this step, information about time-frequency resources supported by the NPC may indicate a sleep rule of the NPC, for example, indicate a quantity of DWs or DW intervals in which the NPC sleeps, or indicate that the NPC sleeps in a time period in a DW interval and operates on a channel in other time periods. In this way, in a time period in which the NPC sleeps, the NPS may perform service discovery instead of the NPC. In a time period in which the NPC operates, the NPS notifies the NPC of information about an NAN device that meets a service requirement, so that when performing service discovery instead of the NPC, the NPS notifies the NAN device of the information about time-frequency resources supported by the NPC. In this way, the NAN device may shake hands with the NPC in the time period in which the NPC operates.

Alternatively, the information about time-frequency resources supported by the NPC may indicate information about a time period and frequency that may be used when the NPC runs a service identified by a service identifier. In this case, the information about time-frequency resources supported by the NPC may be indicated in a bitmap form. A first dimension of a bitmap is time information. That is, a DW interval is divided into 16 TUs, which are a minimum unit for operation of the NPC on a channel. In these 16 TUs, if the NPC is not in a sleep state, it needs to operate on a channel and can switch to another channel for operation only after the 16 TUs ends. A second dimension of the bitmap is channel information, that is, information about a channel on which the NPC operates. A bitmap (bitmap) corresponding to a channel and a minimum unit is set to 1 to indicate that the NPC operates on the channel in a time period indicated by the minimum unit. A bitmap corresponding to a channel and a minimum unit is set to 0 or left blank to indicate that the NPC is in a sleep state in a time period indicated by the minimum unit.

Step 510: An NAN device broadcasts an SDF subscribe message in a DW of a corresponding NAN cluster.

The NAN device needs to search for a service corresponding to the first service identifier information. Then, in this step, the NAN device adds second service identifier information to the broadcast SDF subscribe message. Optionally, the first service identifier information and the second service identifier information are the same or represent a same service.

It should be noted that, to improve security, a transmit end may further convert service identifier information and send converted service identifier information. In this case, when receiving the converted service identifier information, a receive end performs matching on the received service identifier information. There are a plurality of matching manners. Optionally, a matching manner may be as follows: The receive end converts, by using a conversion rule agreed on with the transmit end, service identifier information corresponding to a service that the receive end can provide, so as to obtain converted service identifier information of the receive end; and then when determining that the converted service identifier information of the receive end is the same as the received service identifier information, determines that the received service identifier information is matched.

For example, the transmit end may convert, with reference to time information, the service identifier information to be sent, and send the converted service identifier information. When receiving the converted service identifier information, the receive end performs matching on the received service identifier information. There are a plurality of matching manners. One matching manner is as follows: The receive end converts, with reference to the time information by using the conversion rule agreed on with the transmit end, the service identifier information corresponding to the service that the receive end can provide, so as to obtain the converted service identifier information of the receive end; and then when determining that the converted service identifier information of the receive end is the same as the received service identifier information, determines that the received service identifier information is matched. It should be noted that a service identified by the converted service identifier information is the same as a service identified by the service identifier information before the conversion. Further, the NAN device may add time-frequency resource information of the NAN device to the SDF subscribe message.

Step 520: The NPS receives the SDF subscribe message sent by the NAN device.

Step 530: When the NPS confirms that a service identified by service identifier information carried in the SDF subscribe message matches a service identified by the first service identifier information, the NPS sends an SDF publish message to the NAN device, and adds third service information of the NPC to the SDF publish message.

The matching in this step may mean that the service identified by the service identifier information carried in the SDF subscribe message is the same as the service identified by a first service identifier.

Step 540: The NAN device obtains time-frequency resource information according to the third service information, determines, according to the time-frequency resource information, an operating time period and a channel supported by the NPC, and sends a service discovery message or an NDL establishment message to the NPC in the operating time period supported by the NPC on the channel supported by the NPC.

In this step, when the NAN device sends the service discovery message or the NDL establishment message to the NPC according to the operating time period and the channel that are supported by the NPC and indicated by the time-frequency resource information, the NAN device may alternatively send the service discovery message or the NDL establishment message to the NPC in a DW in the operating time period of the NPC according to a sleep rule of the NPC, where the sleep rule is indicated by the time-frequency resource information.

In this step, the service discovery message or the NDL establishment message may be sent in a unicast or broadcast manner. The service discovery message may be specifically an SDF message in NAN, for example, an SDF subscribe message or an SDF message that is used for requesting session establishment. The NDL establishment message may be a defined message used to trigger the NPC to perform NDL establishment.

Step 550: When receiving no service discovery response message or NDL establishment response message in a preset time period, or still not receiving at least one service discovery response message or NDL establishment response message after sending a preset quantity of service discovery messages or NDL establishment messages to the NPC, the NAN device determines that the NAN device cannot connect to the NPC.

Step 560: The NAN device sends a relay request message to the NPS, so as to request to establish, with the NPC, an NDL that uses the NPS as a relay.

In this step, the NAN device may further add second service information of the NAN device to the relay request message. The second service information includes time-frequency resource information.

Step 570: The NPS receives the relay request message, and determines first time-frequency resource information and second time-frequency resource information according to the relay request message based on the first QoS information included in the first service information.

In this step, when the first QoS information indicates that data transmission requires a relatively high transmission rate, optionally, a first time-frequency resource indicated by the first time-frequency resource information and a second time-frequency resource indicated by the second time-frequency resource information are time periods close to each other.

Step 580: The NPS establishes a first NDL with the NAN device by using the first time-frequency resource information, and establishes a second NDL with the NPC by using the second time-frequency resource information.

According to the description in step 570 in Embodiment 2, the first time-frequency resource information and the second time-frequency resource information are determined based on the first QoS information included in the first service information. Certainly, the second service information may include second QoS information. In this case, the first time-frequency resource information and the second time-frequency resource information may be alternatively determined based on the first QoS information included in the first service information and the second QoS information included in the second service information. Alternatively, one piece of QoS information is selected from the first QoS information and the second QoS information, and the first time-frequency resource information and the second time-frequency resource information are determined according to the selected QoS information. That is, when other steps are the same, step 570 may be alternatively described as follows:

The NPS receives the relay request message, and determines first time-frequency resource information and second time-frequency resource information according to the relay request message based on the first QoS information included in the first service information and second QoS information included in second service information.

Alternatively, the NPS receives the relay request message, selects one piece of QoS information from the first QoS information included in the first service information and second QoS information included in second service information, and determines the first time-frequency resource information and the second time-frequency resource information according to the selected QoS information.

A time sequence of the steps in Embodiment 2 is not specifically limited if the steps are not directly associated with each other. For example, step 500 is not directly associated with step 510. Therefore, step 500 may be performed first, and then step 510 is performed; or step 510 may be performed first, and then step 500 is performed. Cases of other steps are similar. Details are not described herein.

Figure 6A:
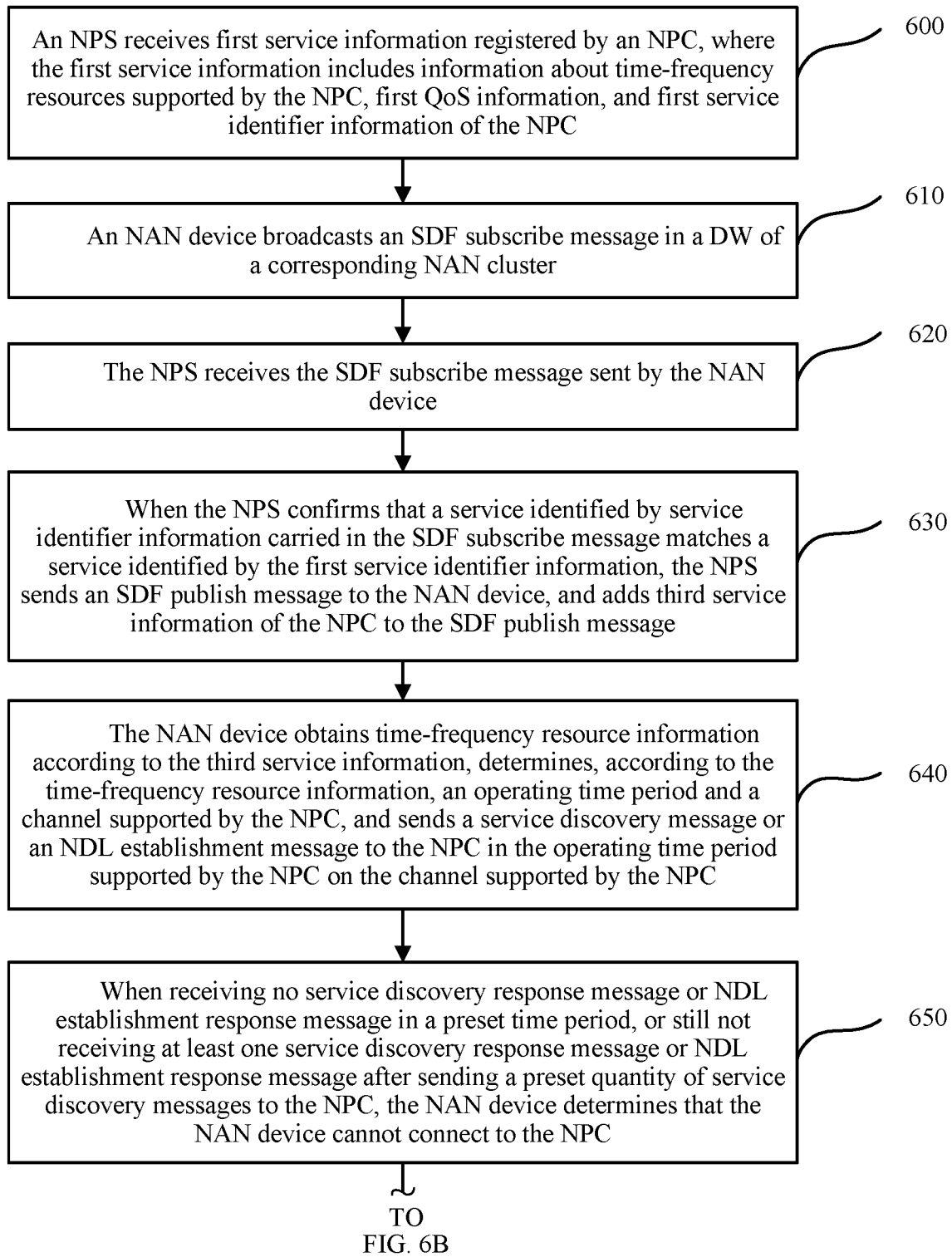
FIG. 6A and FIG. 6B show another embodiment of data link establishment according to an embodiment of the present invention.
Figure 6B:
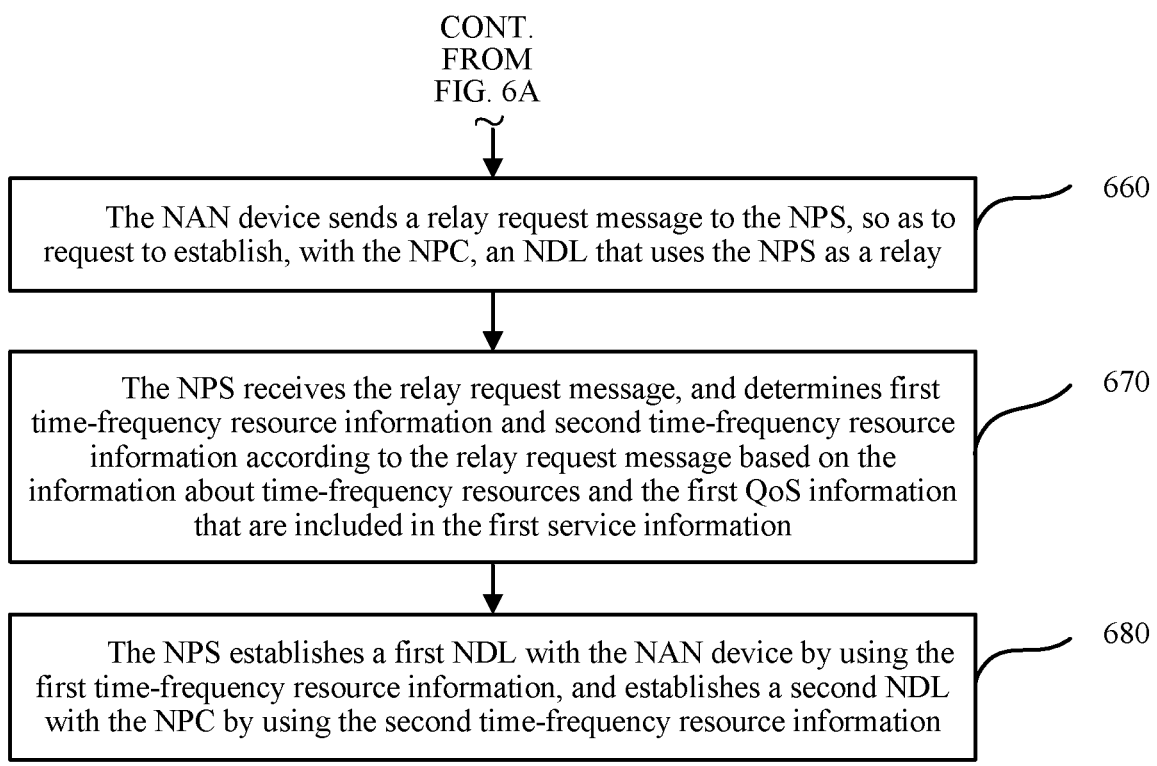

Embodiment 3 is shown in FIG. 6A and FIG. 6B.

Step 600: An NPS receives first service information registered by an NPC, where the first service information includes information about time-frequency resources supported by the NPC, first QoS information, and first service identifier information of the NPC.

In this step, the information about time-frequency resources supported by the NPC may indicate a sleep rule of the NPC, for example, indicate a quantity of DWs or DW intervals in which the NPC sleeps, or indicate that the NPC sleeps in a time period in a DW interval and operates on a channel in other time periods. In this way, in a time period in which the NPC sleeps, the NPS may perform service discovery instead of the NPC. In a time period in which the NPC operates, the NPS notifies the NPC of information about an NAN device that meets a service requirement, so that when performing service discovery instead of the NPC, the NPS notifies the NAN device of the information about time-frequency resources supported by the NPC. In this way, the NAN device may shake hands with the NPC in the time period in which the NPC operates.

Alternatively, the information about time-frequency resources supported by the NPC may indicate information about a time period and frequency that may be used when the NPC runs a service identified by a service identifier. In this case, the information about time-frequency resources supported by the NPC may be indicated in a bitmap form. A first dimension of a bitmap is time information. That is, a DW interval is divided into 16 TUs, which are a minimum unit for operation of the NPC on a channel. In these 16 TUs, if the NPC is not in a sleep state, it needs to operate on a channel and can switch to another channel for operation only after the 16 TUs ends. A second dimension of the bitmap is channel information, that is, information about a channel on which the NPC operates. A bitmap (bitmap) corresponding to a channel and a minimum unit is set to 1 to indicate that the NPC operates on the channel in a time period indicated by the minimum unit. A bitmap corresponding to a channel and a minimum unit is set to 0 or left blank to indicate that the NPC is in a sleep state in a time period indicated by the minimum unit.

Step 610: An NAN device broadcasts an SDF subscribe message in a DW of a corresponding NAN cluster.

The NAN device needs to search for a service corresponding to the first service identifier information. Then, in this step, the NAN device adds second service identifier information to the broadcast SDF subscribe message. Optionally, the first service identifier information and the second service identifier information are the same or represent a same service.

It should be noted that, to improve security, a transmit end may further convert service identifier information and send converted service identifier information. In this case, when receiving the converted service identifier information, a receive end performs matching on the received service identifier information. There are a plurality of matching manners. Optionally, a matching manner may be as follows: The receive end converts, by using a conversion rule agreed on with the transmit end, service identifier information corresponding to a service that the receive end can provide, so as to obtain converted service identifier information of the receive end; and then when determining that the converted service identifier information of the receive end is the same as the received service identifier information, determines that the received service identifier information is matched.

For example, the transmit end may convert, with reference to time information, the service identifier information to be sent, and send the converted service identifier information. When receiving the converted service identifier information, the receive end performs matching on the received service identifier information. There are a plurality of matching manners. One matching manner is as follows: The receive end converts, with reference to the time information by using the conversion rule agreed on with the transmit end, the service identifier information corresponding to the service that the receive end can provide, so as to obtain the converted service identifier information of the receive end; and then when determining that the converted service identifier information of the receive end is the same as the received service identifier information, determines that the received service identifier information is matched.

It should be noted that a service identified by the converted service identifier information is the same as a service identified by the service identifier information before the conversion. Further, the NAN device may add time-frequency resource information of the NAN device to the SDF subscribe message.

Step 620: The NPS receives the SDF subscribe message sent by the NAN device.

Step 630: When the NPS confirms that a service identified by service identifier information carried in the SDF subscribe message matches a service identified by the first service identifier information, the NPS sends an SDF publish message to the NAN device, and adds third service information of the NPC to the SDF publish message.

The matching in this step may mean that the service identified by the service identifier information carried in the SDF subscribe message is the same as the service identified by a first service identifier.

Step 640: The NAN device obtains time-frequency resource information according to the third service information, determines, according to the time-frequency resource information, an operating time period and a channel supported by the NPC, and sends a service discovery message or an NDL establishment message to the NPC in the operating time period supported by the NPC on the channel supported by the NPC.

In this step, when the NAN device sends the service discovery message or the NDL establishment message to the NPC according to the operating time period and the channel that are supported by the NPC and indicated by the time-frequency resource information, the NAN device may alternatively send the service discovery message or the NDL establishment message to the NPC in a DW in the operating time period of the NPC according to a sleep rule of the NPC, where the sleep rule is indicated by the time-frequency resource information.

In this step, the service discovery message or the NDL establishment message may be sent in a unicast or broadcast manner. The service discovery message may be specifically an SDF message in NAN, for example, an SDF subscribe message or an SDF message that is used for requesting session establishment. The NDL establishment message may be a defined message used to trigger the NPC to perform NDL establishment.

Step 650: When receiving no service discovery response message or NDL establishment response message in a preset time period, or still not receiving at least one service discovery response message or NDL establishment response message after sending a preset quantity of service discovery messages to the NPC, the NAN device determines that the NAN device cannot connect to the NPC.

Step 660: The NAN device sends a relay request message to the NPS, so as to request to establish, with the NPC, an NDL that uses the NPS as a relay.

In this step, the NAN device may further add second service information of the NAN device to the relay request message. The second service information includes time-frequency resource information.

Step 670: The NPS receives the relay request message, and determines first time-frequency resource information and second time-frequency resource information according to the relay request message based on the information about time-frequency resources and the first QoS information that are included in the first service information.

In this step, optionally, the NPS itself may determine, in the following manner, the first time-frequency resource information and the second time-frequency resource information according to the information about time-frequency resources and the first QoS information that are included in the first service information:

preliminarily determining the first time-frequency resource information and the second time-frequency resource information according to an overlapping part between the information about time-frequency resources included in the first service information and any two time-frequency resources in information about time-frequency resources supported by the NPS; and determining whether a time interval between the first time-frequency resource information and the second time-frequency resource information meets a maximum service interval required in the first QoS information; if the time interval meets the maximum service interval, using the preliminarily determined first time-frequency resource information and second time-frequency resource information as final first time-frequency resource information and second time-frequency resource information; if the time interval does not meet the maximum service interval, further negotiating, by the NPS, with the NAN device, and sending third time-frequency resource information that meets the maximum service interval to the NAN device; if the NAN device accepts the third time-frequency resource information, using the preliminarily determined first time-frequency resource information as the final first time-frequency resource information, and using the third time-frequency resource information as the final second time-frequency resource information; if the NAN device does not accept the third time-frequency resource information, further negotiating, by the NPS, with the NPC, and sending fourth time-frequency resource information that meets the maximum service interval to the NPC; if the NPC accepts the fourth time-frequency resource information, using the preliminarily determined first time-frequency resource information as the final first time-frequency resource information, and using the fourth time-frequency resource information as the final second time-frequency resource information.

Optionally, the NPS itself may determine, in the following manner, the first time-frequency resource information and the second time-frequency resource information according to the information about time-frequency resources and the first QoS information that are included in the first service information:

preliminarily determining the first time-frequency resource information according to an overlapping part between the information about time-frequency resources included in the first service information and any two time-frequency resources in information about time-frequency resources supported by the NPS; and preliminarily determining the second time-frequency resource information according to the first QoS information; sending the second time-frequency resource information to the NAN device, and if the NAN device agrees to accept a second time-frequency resource, using the preliminarily determined first time-frequency resource information and second time-frequency resource information as final first time-frequency resource information and second time-frequency resource information; if the NAN device does not agree to accept the second time-frequency resource, sending the second time-frequency resource information to the NPC, and if the NPC agrees to accept the second time-frequency resource, using the preliminarily determined first time-frequency resource information and second time-frequency resource information as the final first time-frequency resource information and second time-frequency resource information.

It should be noted that, the maximum service interval required in the first QoS information is used as an example for description. Certainly, it may also be a maximum service interval required in second QoS information, or may be the larger value of the maximum service interval required in the first QoS information and the maximum service interval required in the second QoS information.

Step 680: The NPS establishes a first NDL with the NAN device by using the first time-frequency resource information, and establishes a second NDL with the NPC by using the second time-frequency resource information.

According to the description in step 670 in Embodiment 3, the first time-frequency resource information and the second time-frequency resource information are determined based on the information about time-frequency resources and the first QoS information that are included in the first service information. Certainly, the first time-frequency resource information and the second time-frequency resource information may be alternatively determined based on the time-frequency resource information included in the first service information, the time-frequency resource information included in the second service information, the first QoS information, and the second QoS information. That is, when other steps are the same, step 470 may be alternatively described as follows:

The NPS receives the relay request message, and determines first time-frequency resource information and second time-frequency resource information according to the relay request message based on the information about time-frequency resources included in the first service information and time-frequency resource information included in second service information.

Alternatively, the NPS receives the relay request message, determines second time-frequency resource information according to the relay request message based on the information about time-frequency resources included in the first service information and the information about time-frequency resources supported by the NPS, and determines first time-frequency resource information according to the time-frequency resource information included in the second service information, the information about time-frequency resources supported by the NPS, the first QoS information, and the second QoS information.

In this embodiment of the present invention, the second NAN device may obtain the third service information of the third NAN device by using an upper-layer application or by receiving NPS information or a service discovery message sent by the third NAN device. When determining that the second NAN device cannot connect to the third NAN device, the second NAN device searches for a communication relay device that connects the second NAN device and the third NAN device. In the following example, an NAN device serves as the communication relay device. The NAN device serving as the communication relay device may be an NPS, or may be a common NAN device that can serve as a communication relay. This is not limited in the present invention.

A time sequence of the steps in Embodiment 3 is not specifically limited if the steps are not directly associated with each other. For example, step 600 is not directly associated with step 610. Therefore, step 600 may be performed first, and then step 610 is performed; or step 610 may be performed first, and then step 600 is performed. Cases of other steps are similar. Details are not described herein.

Figure 7:
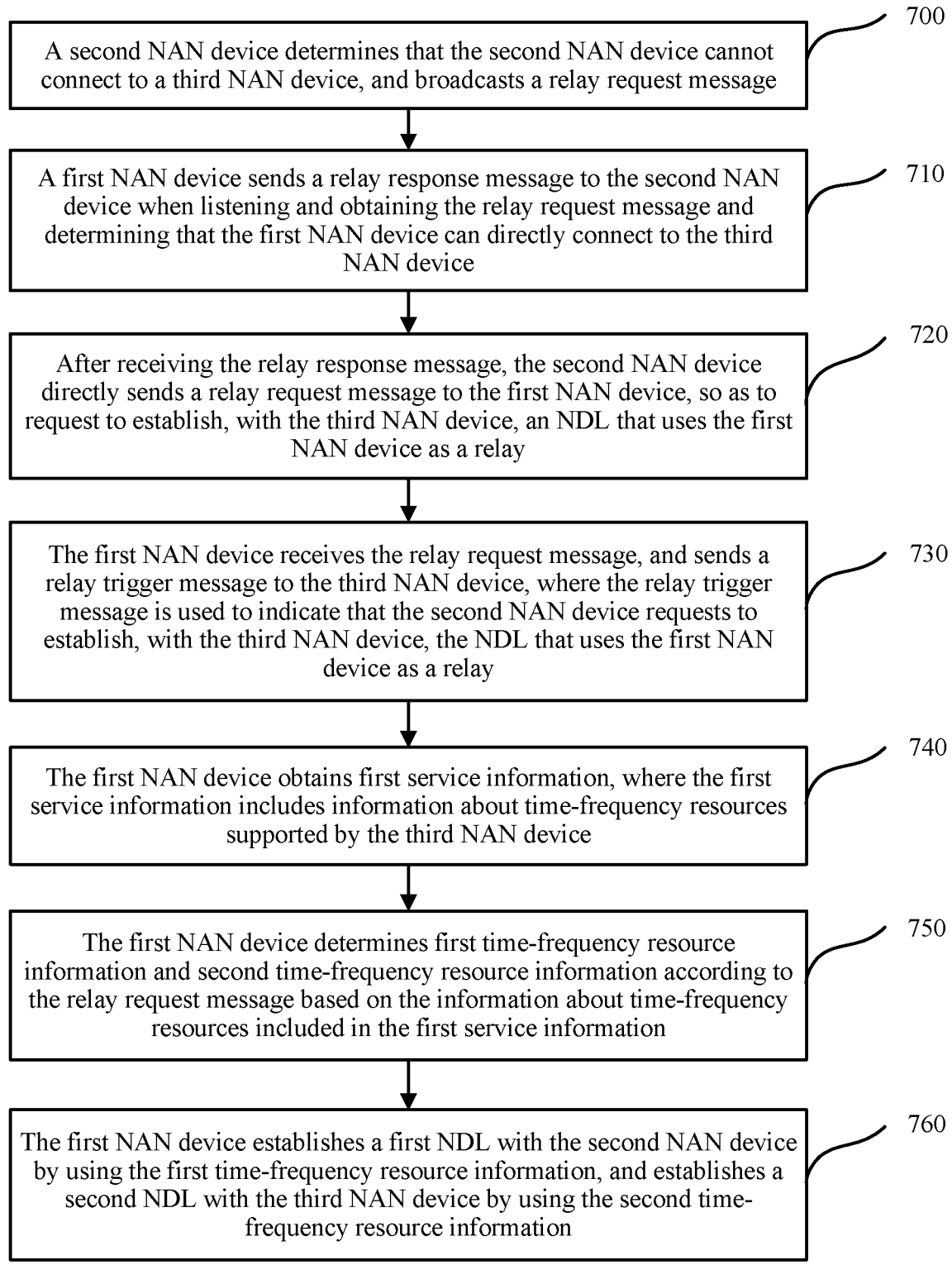
FIG. 7 shows another embodiment of data link establishment according to an embodiment of the present invention.

Embodiment 4 is shown in FIG. 7.

Step 700: A second NAN device determines that the second NAN device cannot connect to a third NAN device, and broadcasts a relay request message.

Step 710: A first NAN device sends a relay response message to the second NAN device when listening and obtaining the relay request message and determining that the first NAN device can directly connect to the third NAN device.

Step 720: After receiving the relay response message, the second NAN device directly sends a relay request message to the first NAN device, so as to request to establish, with the third NAN device, an NDL that uses the first NAN device as a relay.

In this step, the second NAN device may further add second service information of the second NAN device to the relay request message. The second service information includes time-frequency resource information.

Step 730: The first NAN device receives the relay request message, and sends a relay trigger message to the third NAN device, where the relay trigger message is used to indicate that the second NAN device requests to establish, with the third NAN device, the NDL that uses the first NAN device as a relay.

Step 740: The first NAN device obtains first service information, where the first service information includes information about time-frequency resources supported by the third NAN device.

In this step, the information about time-frequency resources supported by the third NAN device may indicate a sleep rule of the third NAN device, for example, indicate a quantity of DWs or DW intervals in which the third NAN device sleeps, or indicate that the third NAN device sleeps in a time period in a DW interval and operates on a channel in other time periods. In this way, in a time period in which the third NAN device sleeps, the first NAN device may perform service discovery instead of the third NAN device. In a time period in which the third NAN device operates, the first NAN device notifies the third NAN device of information about a second NAN device that meets a service requirement, so that when performing service discovery instead of the third NAN device, the first NAN device notifies the second NAN device of the information about time-frequency resources supported by the third NAN device. In this way, the second NAN device may shake hands with the third NAN device in the time period in which the third NAN device operates.

Alternatively, the information about time-frequency resources supported by the third NAN device may indicate information about a time period and frequency that may be used when the third NAN device runs a service identified by a service identifier. In this case, the information about time-frequency resources supported by the third NAN device may be indicated in a bitmap form. A first dimension of a bitmap is time information. That is, a DW interval is divided into 16 TUs, which are a minimum unit for operation of the third NAN device on a channel. In these 16 TUs, if the third NAN device is not in a sleep state, it needs to operate on a channel and can switch to another channel for operation only after the 16 TUs ends. A second dimension of the bitmap is channel information, that is, information about a channel on which the third NAN device operates. A bitmap (bitmap) corresponding to a channel and a minimum unit is set to 1 to indicate that the third NAN device operates on the channel in a time period indicated by the minimum unit. A bitmap corresponding to a channel and a minimum unit is set to 0 or left blank to indicate that the third NAN device is in a sleep state in a time period indicated by the minimum unit.

In this step, the first NAN device may obtain the first service information of the third NAN device in the following manner:

The first NAN device receives a service registration message sent by the third NAN device, and obtains the first service information from the service registration message; or the first NAN device receives a service discovery message sent by the third NAN device, and obtains the first service information from the service discovery message; or the first NAN device receives a service information notification message sent by the third NAN device, and obtains the first service information from the service information notification message; or the first NAN device obtains the first service information of the third NAN device by using an upper-layer application.

Step 750: The first NAN device determines first time-frequency resource information and second time-frequency resource information according to the relay request message based on the information about time-frequency resources included in the first service information.

In this step, when determining the first time-frequency resource information and the second time-frequency resource information according to the information about time-frequency resources carried in the first service information, the first NAN device may determine the first time-frequency resource information and the second time-frequency resource information directly according to the information about time-frequency resources carried in the first service information. Alternatively, the first NAN device may determine the first time-frequency resource information and the first time-frequency resource information according to the information about time-frequency resources carried in the first service information and time-frequency resources supported by the first NAN device.

Alternatively, when the relay request message carries information about time-frequency resources supported by the second NAN device, the first NAN device may alternatively determine the first time-frequency resource information and the second time-frequency resource information according to the information about time-frequency resources carried in the first service information and the time-frequency resource information carried in the second service information.

Step 760: The first NAN device establishes a first NDL with the second NAN device by using the first time-frequency resource information, and establishes a second NDL with the third NAN device by using the second time-frequency resource information.

According to the description in Embodiment 4, the first NAN device determines the first time-frequency resource information and the second time-frequency resource information according to time-frequency resource information included in service information. Certainly, the first NAN device may alternatively determine the first time-frequency resource information and the second time-frequency resource information according to QoS information included in the service information, or the first NAN device may determine the first time-frequency resource information and the second time-frequency resource information according to both the QoS information and the time-frequency resource information that are included in the service information. The processes are similar to those in Embodiment 1, Embodiment 2, and Embodiment 3. Details are not described herein.

A time sequence of the steps in Embodiment 4 is not specifically limited if the steps are not directly associated with each other. For example, step 730 is not directly associated with step 740. Therefore, step 730 may be performed first, and then step 740 is performed; or step 740 may be performed first, and then step 730 is performed. For another example, when step 750 is specifically performed, the first time-frequency resource information may be determined first, and then the second time-frequency resource information is determined; or the second time-frequency resource information may be determined first, and then the first time-frequency resource information is determined. For another example, when step 760 is specifically performed, the first NDL may be established first, and then the second NDL is established; or the second NDL may be established first, and then the first NDL is established. Cases of other steps are similar. Details are not described herein.

Figure 8A:
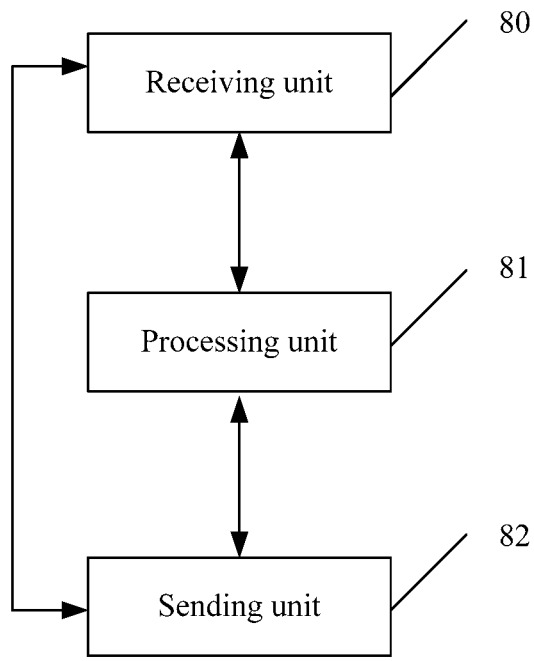
FIG. 8A is a schematic diagram of a first NAN device according to an embodiment of the present invention.

Referring to FIG. 8A, a first NAN device is provided in an embodiment of the present invention. The first NAN device includes a receiving unit 80, a processing unit 81, and a sending unit 82.

The receiving unit 80 is configured to receive a relay request message sent by a second NAN device, where the relay request message is used to request the first NAN device to establish an NAN data link NDL that uses the first NAN device as a relay, and the NDL is a data link between the second NAN device and a third NAN device.

The processing unit 81 is configured to determine first time-frequency resource information and second time-frequency resource information according to the relay request message.

The processing unit 81 is further configured to establish, with the second NAN device, a first NDL that uses the first time-frequency resource information, and establish, with the third NAN device, a second NDL that uses the second time-frequency resource information.

In this embodiment of the present invention, optionally, that the processing unit 81 determines the first time-frequency resource information and the second time-frequency resource information according to the relay request message is specifically:

The processing unit 81 itself determines the first time-frequency resource information and the second time-frequency resource information according to the relay request message; or receives, according to the relay request message, time-frequency resource information sent by the second NAN device, and determines the first time-frequency resource information and the second time-frequency resource information according to the time-frequency resource information sent by the second NAN device; or receives, according to the relay request message, time-frequency resource information sent by the third NAN device, and determines the first time-frequency resource information and the second time-frequency resource information according to the time-frequency resource information sent by the third NAN device.

Alternatively, the receiving unit 80 is further configured to receive time-frequency resource information sent by the second NAN device and time-frequency resource information sent by the third NAN device. The processing unit 81 uses the time-frequency resource information that is sent by the second NAN device and received by the receiving unit 80 as the first time-frequency resource information, and uses the time-frequency resource information received by the receiving unit 80 as the second time-frequency resource information.

In this embodiment of the present invention, the processing unit 81 is further configured to obtain first service information of the third NAN device and/or second service information of the second NAN device.

That the processing unit 81 itself determines the first time-frequency resource information and the second time-frequency resource information according to the relay request message is specifically:

The processing unit 81 itself determines the first time-frequency resource information and the second time-frequency resource information based on the relay request message according to the first service information and/or the second service information.

In this embodiment of the present invention, optionally, that the processing unit 81 itself determines the first time-frequency resource information and the second time-frequency resource information based on the relay request message according to the first service information and/or the second service information is specifically:

The processing unit 81 itself determines the first time-frequency resource information and the second time-frequency resource information based on the relay request message according to at least one of: time-frequency resource information included in the first service information, time-frequency resource information included in the second service information, or information about time-frequency resources supported by the first NAN device; or the processing unit 81 itself determines the first time-frequency resource information and the second time-frequency resource information based on the relay request message according to first service identifier information included in the first service information and second service identifier information included in the second service information.

In this embodiment of the present invention, optionally, that the processing unit 81 itself determines the first time-frequency resource information and the second time-frequency resource information based on the relay request message according to the first service information and/or the second service information is specifically:

The processing unit 81 itself determines the first time-frequency resource information and the second time-frequency resource information based on the relay request message according to first QoS information included in the first service information and/or second QoS information included in the second service information.

In this embodiment of the present invention, optionally, that the processing unit 81 itself determines the first time-frequency resource information and the second time-frequency resource information based on the relay request message according to at least one of: time-frequency resource information included in the first service information, time-frequency resource information included in the second service information, or information about time-frequency resources supported by the first NAN device is specifically:

The processing unit 81 itself determines, based on the relay request message, the first time-frequency resource information according to the time-frequency resource information included in the first service information and the information about time-frequency resources supported by the first NAN device, and determines the second time-frequency resource information according to the time-frequency resource information included in the second service information and the information about time-frequency resources supported by the first NAN device; or the processing unit 81 itself determines the first time-frequency resource information and the second time-frequency resource information based on the relay request message according to the time-frequency resource information included in the second service information and the information about time-frequency resources supported by the first NAN device; or the processing unit 81 itself determines the first time-frequency resource information and the second time-frequency resource information based on the relay request message according to the time-frequency resource information included in the first service information and the information about time-frequency resources supported by the first NAN device; or the processing unit 81 itself determines the first time-frequency resource information and the second time-frequency resource information based on the relay request message according to the time-frequency resource information included in the first service information and the time-frequency resource information included in the second service information.

In this embodiment of the present invention, the receiving unit 80 is further configured to receive a service registration message sent by the third NAN device, a service discovery message sent by the third NAN device, or a service information notification message sent by the third NAN device.

That the processing unit 81 obtains the first service information of the third NAN device is specifically:

obtaining the first service information from the service registration message; or obtaining the first service information from the service discovery message; or obtaining the first service information from the service information notification message; or obtaining the first service information of the third NAN device by using an upper-layer application.

In this embodiment of the present invention, the sending unit 82 is further included and configured to send a service discovery message to the second NAN device. The receiving unit 80 is further configured to receive a service discovery response message sent by the second NAN device.

The receiving unit 80 is further configured to receive a service discovery message sent by the second NAN device.

That the processing unit 81 obtains the second service information of the second NAN device is specifically:

obtaining the second service information from the relay request message; or obtaining the second service information from the service discovery response message; or obtaining the second service information from the service discovery message; or obtaining the second service information by using an upper-layer application.

The receiving unit 80 is further configured to receive an SDF subscribe message sent by the second NAN device, where the SDF subscribe message is used to search for a service required by the second NAN device.

The processing unit 81 is further configured to determine that the service required by the second NAN device matches a service that the third NAN device can provide.

The sending unit 82 is further included and configured to send an SDF publish message to the second NAN device when the processing unit 81 determines that the service required by the second NAN device matches the service that the third NAN device can provide, where the SDF publish message carries information about the service that the third NAN device can provide.

Figure 8B:
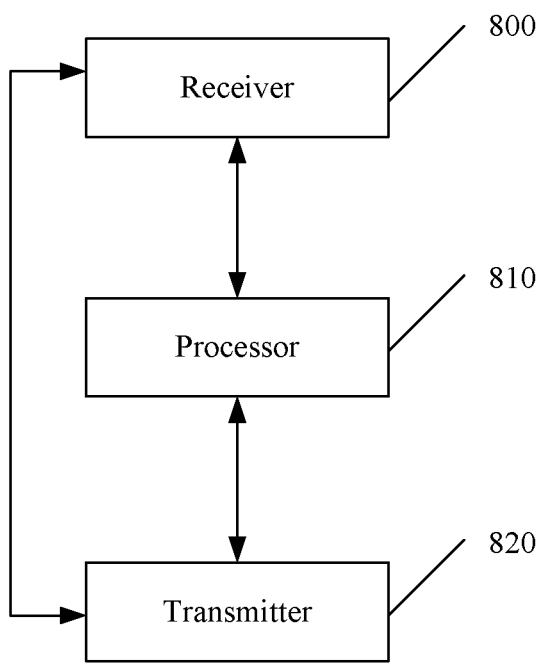
FIG. 8B is another schematic diagram of a first NAN device according to an embodiment of the present invention.

Referring to FIG. 8B, a first NAN device is provided in an embodiment of the present invention. The first NAN device includes a receiver 800 and a processor 810.

The receiver 800 is configured to receive a relay request message sent by a second NAN device, where the relay request message is used to request the first NAN device to establish an NAN data link NDL that uses the first NAN device as a relay, and the NDL is a data link between the second NAN device and a third NAN device.

The processor 810 is configured to determine first time-frequency resource information and second time-frequency resource information according to the relay request message.

The processor 810 is further configured to establish, with the second NAN device, a first NDL that uses the first time-frequency resource information, and establish, with the third NAN device, a second NDL that uses the second time-frequency resource information.

Optionally, that the processor 810 determines the first time-frequency resource information and the second time-frequency resource information according to the relay request message is specifically:

The processor 810 itself determines the first time-frequency resource information and the second time-frequency resource information according to the relay request message; or receives, according to the relay request message, time-frequency resource information sent by the second NAN device, and determines the first time-frequency resource information and the second time-frequency resource information according to the time-frequency resource information sent by the second NAN device; or receives, according to the relay request message, time-frequency resource information sent by the third NAN device, and determines the first time-frequency resource information and the second time-frequency resource information according to the time-frequency resource information sent by the third NAN device.

Alternatively, the receiver 800 is further configured to receive time-frequency resource information sent by the second NAN device and time-frequency resource information sent by the third NAN device; and the processor 810 uses the time-frequency resource information that is sent by the second NAN device and received by the receiver 800 as the first time-frequency resource information, and uses the time-frequency resource information received by the receiver 800 as the second time-frequency resource information.

Optionally, the processor 810 is further configured to obtain first service information of the third NAN device and/or second service information of the second NAN device.

That the processor 810 itself determines the first time-frequency resource information and the second time-frequency resource information according to the relay request message is specifically:

The processor 810 itself determines the first time-frequency resource information and the second time-frequency resource information based on the relay request message according to the first service information and/or the second service information.

Optionally, that the processor 810 itself determines the first time-frequency resource information and the second time-frequency resource information based on the relay request message according to the first service information and/or the second service information is specifically:

The processor 810 itself determines the first time-frequency resource information and the second time-frequency resource information based on the relay request message according to at least one of: time-frequency resource information included in the first service information, time-frequency resource information included in the second service information, or information about time-frequency resources supported by the first NAN device; or the processor 810 itself determines the first time-frequency resource information and the second time-frequency resource information based on the relay request message according to first service identifier information included in the first service information and second service identifier information included in the second service information.

Optionally, that the processor 810 itself determines the first time-frequency resource information and the second time-frequency resource information based on the relay request message according to the first service information and/or the second service information is specifically:

The processor 810 itself determines the first time-frequency resource information and the second time-frequency resource information based on the relay request message according to first QoS information included in the first service information and/or second QoS information included in the second service information.

Optionally, that the processor 810 itself determines the first time-frequency resource information and the second time-frequency resource information based on the relay request message according to at least one of: time-frequency resource information included in the first service information, time-frequency resource information included in the second service information, or information about time-frequency resources supported by the first NAN device is specifically:

The processor 810 itself determines, based on the relay request message, the first time-frequency resource information according to the time-frequency resource information included in the first service information and the information about time-frequency resources supported by the first NAN device, and determines the second time-frequency resource information according to the time-frequency resource information included in the second service information and the information about time-frequency resources supported by the first NAN device; or the processor 810 itself determines the first time-frequency resource information and the second time-frequency resource information based on the relay request message according to the time-frequency resource information included in the second service information and the information about time-frequency resources supported by the first NAN device; or the processor 810 itself determines the first time-frequency resource information and the second time-frequency resource information based on the relay request message according to the time-frequency resource information included in the first service information and the information about time-frequency resources supported by the first NAN device; or the processor 810 itself determines the first time-frequency resource information and the second time-frequency resource information based on the relay request message according to the time-frequency resource information included in the first service information and the time-frequency resource information included in the second service information.

Optionally, the receiver 800 is further configured to receive a service registration message sent by the third NAN device, a service discovery message sent by the third NAN device, or a service information notification message sent by the third NAN device.

That the processor 810 obtains the first service information of the third NAN device is specifically:

obtaining the first service information from the service registration message; or obtaining the first service information from the service discovery message; or obtaining the first service information from the service information notification message; or obtaining the first service information of the third NAN device by using an upper-layer application.

A transmitter 820 is further included and configured to send a service discovery message to the second NAN device. The receiver 800 is further configured to receive a service discovery response message sent by the second NAN device.

The receiver 800 is further configured to receive a service discovery message sent by the second NAN device.

That the processor 810 obtains the second service information of the second NAN device is specifically:

obtaining the second service information from the relay request message; or obtaining the second service information from the service discovery response message; or obtaining the second service information from the service discovery message; or obtaining the second service information by using an upper-layer application.

The receiver 800 is further configured to receive an SDF subscribe message sent by the second NAN device, where the SDF subscribe message is used to search for a service required by the second NAN device.

The processor 810 is further configured to determine that the service required by the second NAN device matches a service that the third NAN device can provide.

The transmitter 820 is further included and configured to send an SDF publish message to the second NAN device when the processor 810 determines that the service required by the second NAN device matches the service that the third NAN device can provide, where the SDF publish message carries information about the service that the third NAN device can provide.

In the embodiments described in FIG. 8A and FIG. 8B, service data of the second NAN device and the third NAN device may be forwarded by using the first NDL and the second NDL, so that data is successfully transmitted between the second NAN device and the third NAN device. Optionally, the service data may be data for establishing an authentication connection between the second NAN device and the third NAN device or service content data of the second NAN device and the third NAN device. This is not specifically limited herein.

Figure 9A:
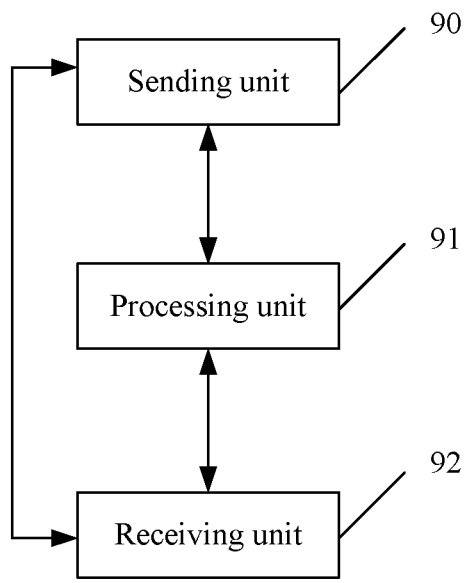
FIG. 9A is a schematic diagram of a second NAN device according to an embodiment of the present invention.

Referring to FIG. 9A, a second NAN device is provided in an embodiment of the present invention. The second NAN device includes a sending unit 90 and a processing unit 91.

The sending unit 90 is configured to send a relay request message to a first NAN device, where the relay request message is used to request the first NAN device to establish an NAN data link NDL that uses the first NAN device as a relay, and the NDL is a data link between the second NAN device and a third NAN device.

The processing unit 91 is configured to determine first time-frequency resource information.

The processing unit 91 is further configured to establish, with the first NAN device, a first NDL that uses the first time-frequency resource information.

A receiving unit 92 is further included and configured to receive time-frequency resource information sent by the first NAN device.

That the processing unit 91 determines the first time-frequency resource information is specifically:

The processing unit 91 itself determines the first time-frequency resource information; or uses the time-frequency resource information that is sent by the first NAN device and received by the receiving unit 92 as the first time-frequency resource information.

The processing unit 91 is further configured to obtain third service information of the third NAN device and/or second service information of the second NAN device.

That the processing unit 91 itself determines the first time-frequency resource information is specifically:

The processing unit 91 itself determines the first time-frequency resource information according to the third service information and/or the second service information.

Optionally, that the processing unit 91 itself determines the first time-frequency resource information according to the third service information and/or the second service information is specifically:

The processing unit 91 itself determines the first time-frequency resource information according to at least one of: time-frequency resource information included in the third service information, time-frequency resource information included in the second service information, or information about time-frequency resources supported by the first NAN device; or the processing unit 91 itself determines the first time-frequency resource information according to first service identifier information included in the third service information and second service identifier information included in the second service information.

Optionally, that the processing unit 91 itself determines the first time-frequency resource information according to the third service information and/or the second service information is specifically:

The processing unit 91 itself determines the first time-frequency resource information according to first QoS information included in the third service information and/or second QoS information included in the second service information.

Optionally, that the processing unit 91 itself determines the first time-frequency resource information according to at least one of: time-frequency resource information included in the third service information, time-frequency resource information included in the second service information, or information about time-frequency resources supported by the first NAN device is specifically:

The processing unit 91 itself determines the first time-frequency resource information according to the time-frequency resource information included in the third service information and the information about time-frequency resources supported by the first NAN device; or the processing unit 91 itself determines the first time-frequency resource information according to the time-frequency resource information included in the second service information and the information about time-frequency resources supported by the first NAN device; or the processing unit 91 itself determines the first time-frequency resource information according to the time-frequency resource information included in the third service information and the time-frequency resource information included in the second service information.

The processing unit 91 is further configured to determine that the second NAN device cannot connect to the third NAN device.

Optionally, that the processing unit 91 determines that the second NAN device cannot connect to the third NAN device is specifically:

obtaining the third service information of the third NAN device, sending, by the sending unit 90, a service discovery message to the third NAN device according to the third service information, and when the receiving unit 92 receives, in preset duration, no service discovery response message sent by the third NAN device, determining, by the processing unit 91, that the second NAN device cannot connect to the third NAN device; or obtaining the third service information of the third NAN device, sending, by the sending unit 90, a service link connection request message to the third NAN device according to the third service information, and when the receiving unit 92 receives, in preset duration, no service link connection response message sent by the third NAN device, determining, by the processing unit 91, that the second NAN device cannot connect to the third NAN device.

The receiving unit 92 is further included and configured to receive the third service information sent by the first NAN device, or receive a service discovery message sent by the third NAN device.

That the processing unit 91 obtains the third service information of the third NAN device is specifically:

using the third service information that is sent by the first NAN device and received by the receiving unit 92 as the third service information; or obtaining the third service information from the service discovery message; or obtaining the third service information by using an upper-layer application.

The processing unit 91 is further configured to obtain device information of the first NAN device.

That the sending unit 90 sends the relay request message to the first NAN device is specifically:

sending the relay request message to the first NAN device according to the device information of the first NAN device.

The sending unit 90 is further configured to send a service discovery message. The receiving unit 92 is further included and configured to receive a service discovery response message sent by the first NAN device.

The receiving unit 92 is further configured to receive a service discovery message sent by the first NAN device, or receive a relay request response message sent by the first NAN device.

That the processing unit 91 obtains the device information of the first NAN device is specifically:

obtaining the device information of the first NAN device from the service discovery response message received by the receiving unit 92; or obtaining the device information of the first NAN device from the service discovery message that is sent by the first NAN device and received by the receiving unit 92; or obtaining the device information of the first NAN device from the relay request response message that is sent by the first NAN device and received by the receiving unit 92; or obtaining the device information of the first NAN device by using an upper-layer application.

Figure 9B:
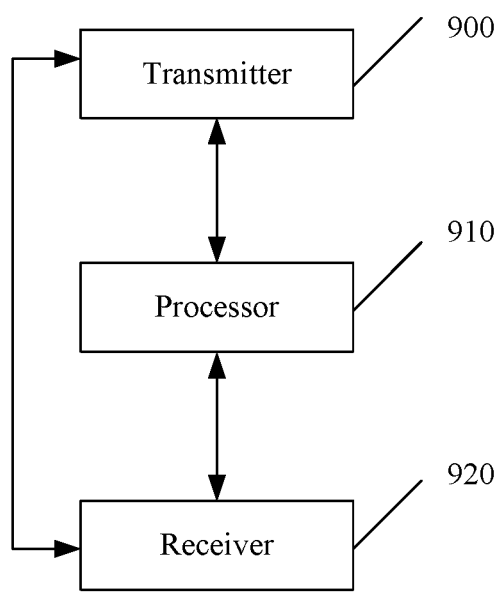
FIG. 9B is another schematic diagram of a second NAN device according to an embodiment of the present invention.

Referring to FIG. 9B, a second NAN device is provided in an embodiment of the present invention. The second NAN device includes a transmitter 900 and a processor 910.

The transmitter 900 is configured to send a relay request message to a first NAN device, where the relay request message is used to request the first NAN device to establish an NAN data link NDL that uses the first NAN device as a relay, and the NDL is a data link between the second NAN device and a third NAN device.

The processor 910 is configured to determine first time-frequency resource information.

The processor 910 is further configured to establish, with the first NAN device, a first NDL that uses the first time-frequency resource information.

A receiver 920 is further included and configured to receive time-frequency resource information sent by the first NAN device.

That the processor 910 determines the first time-frequency resource information is specifically:

The processor 910 itself determines the first time-frequency resource information; or uses the time-frequency resource information that is sent by the first NAN device and received by the receiver 920 as the first time-frequency resource information.

The processor 910 is further configured to obtain third service information of the third NAN device and/or second service information of the second NAN device.

That the processor 910 itself determines the first time-frequency resource information is specifically:

The processor 910 itself determines the first time-frequency resource information according to the third service information and/or the second service information.

Optionally, that the processor 910 itself determines the first time-frequency resource information according to the third service information and/or the second service information is specifically:

The processor 910 itself determines the first time-frequency resource information according to at least one of: time-frequency resource information included in the third service information, time-frequency resource information included in the second service information, or information about time-frequency resources supported by the first NAN device; or the processor 910 itself determines the first time-frequency resource information according to first service identifier information included in the third service information and second service identifier information included in the second service information.

Optionally, that the processor 910 itself determines the first time-frequency resource information according to the third service information and/or the second service information is specifically:

The processor 910 itself determines the first time-frequency resource information according to first QoS information included in the third service information and/or second QoS information included in the second service information.

Optionally, that the processor 910 itself determines the first time-frequency resource information according to at least one of: time-frequency resource information included in the third service information, time-frequency resource information included in the second service information, or information about time-frequency resources supported by the first NAN device is specifically:

The processor 910 itself determines the first time-frequency resource information according to the time-frequency resource information included in the third service information and the information about time-frequency resources supported by the first NAN device; or the processor 910 itself determines the first time-frequency resource information according to the time-frequency resource information included in the second service information and the information about time-frequency resources supported by the first NAN device; or the processor 910 itself determines the first time-frequency resource information according to the time-frequency resource information included in the third service information and the time-frequency resource information included in the second service information.

The processor 910 is further configured to determine that the second NAN device cannot connect to the third NAN device.

Further, that the processor 910 determines that the second NAN device cannot connect to the third NAN device is specifically:

obtaining the third service information of the third NAN device, sending, by the transmitter 900, a service discovery message to the third NAN device according to the third service information, and when the receiver 920 receives, in preset duration, no service discovery response message sent by the third NAN device, determining, by the processor 910, that the second NAN device cannot connect to the third NAN device; or obtaining the third service information of the third NAN device, sending, by the transmitter 900, a service link connection request message to the third NAN device according to the third service information, and when the receiver 920 receives, in preset duration, no service link connection response message sent by the third NAN device, determining, by the processor 910, that the second NAN device cannot connect to the third NAN device.

The receiver 920 is further included and configured to receive the third service information sent by the first NAN device, or receive a service discovery message sent by the third NAN device.

That the processor 910 obtains the third service information of the third NAN device is specifically:

using the third service information that is sent by the first NAN device and received by the receiver 920 as the third service information; or obtaining the third service information from the service discovery message; or obtaining the third service information by using an upper-layer application.

The processor 910 is further configured to obtain device information of the first NAN device.

That the transmitter 900 sends the relay request message to the first NAN device is specifically:

sending the relay request message to the first NAN device according to the device information of the first NAN device.

The transmitter 900 is further configured to send a service discovery message. The receiver 920 is further included and configured to receive a service discovery response message sent by the first NAN device.

The receiver 920 is further configured to receive a service discovery message sent by the first NAN device, or receive a relay request response message sent by the first NAN device.

That the processor 910 obtains the device information of the first NAN device is specifically:

obtaining the device information of the first NAN device from the service discovery response message received by the receiver 920; or obtaining the device information of the first NAN device from the service discovery message that is sent by the first NAN device and received by the receiver 920; or obtaining the device information of the first NAN device from the relay request response message that is sent by the first NAN device and received by the receiver 920; or obtaining the device information of the first NAN device by using an upper-layer application.

In the embodiments described in FIG. 9A and FIG. 9B, service data of the second NAN device and the third NAN device may be forwarded by using the first NDL and a second NDL, so that data is successfully transmitted between the second NAN device and the third NAN device. Optionally, the service data may be data for establishing an authentication connection between the second NAN device and the third NAN device or service content data of the second NAN device and the third NAN device. This is not specifically limited herein.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A data link establishment method, comprising:

receiving, by a first neighbor awareness networking (NAN) device, a relay request message sent by a second NAN device, wherein the relay request message is configured to request the first NAN device to establish a NAN data link (NDL) between the second NAN device and a third NAN device and to serve as a relay in the NDL, wherein the first NAN device, the second NAN device, and the third NAN device communicate with each other based on Wi-Fi;

determining, by the first NAN device, first time-frequency resource information and second time-frequency resource information according to the relay request message, wherein the first and second time-frequency resource information each indicates resources including a time period and one or more channels;

establishing, by the first NAN device with the second NAN device, a first NDL that uses the resources indicated in the first time-frequency resource information; and establishing, by the first NAN device with the third NAN device, a second NDL that uses the resources indicated in the second time-frequency resource information, wherein first and second NDL form the NDL between the second and third NAN devices with the first NAN device as the relay.

2. The method according to claim 1, wherein determining, by the first NAN device, first time-frequency resource information and second time-frequency resource information according to the relay request message comprises at least one of the following:
obtaining, by the first NAN device according to the relay request message, time-frequency resource information from the second NAN device, and determining the first time-frequency resource information and the second time-frequency resource information according to the time-frequency resource information obtained from the second NAN device;
obtaining, by the first NAN device according to the relay request message, time-frequency resource information from the third NAN device, and determining the first time-frequency resource information and the second time-frequency resource information according to the time-frequency resource information obtained from the third NAN device;
receiving, by the first NAN device according to the relay request message, time-frequency resource information sent by the second NAN device, and using the time-frequency resource information sent by the second NAN device as the first time-frequency resource information; or
receiving time-frequency resource information sent by the third NAN device, and using the received time-frequency resource information as the second time-frequency resource information.

3. The method according to claim 1, wherein before determining, by the first NAN device, the first time-frequency resource information and the second time-frequency resource information according to the relay request message, the method further comprises:
obtaining, by the first NAN device, at least one of first service information of the third NAN device, or second service information of the second NAN device; and
determining, by the first NAN device, the first time-frequency resource information and the second time-frequency resource information according to the relay request message comprises:
determining, by the first NAN device, the first time-frequency resource information and the second time-frequency resource information based on the relay request message according to the first service information, and/or the second service information.

4. The method according to claim 1, wherein determining, by the first NAN device, the first time-frequency resource information and the second time-frequency resource information based on the relay request message according to the first service information, and/or the second service information comprises:
determining, by the first NAN device, the first time-frequency resource information and the second time-frequency resource information based on the relay request message according to at least one of: time-frequency resource information comprised in the first service information, time-frequency resource information comprised in the second service information, or information about time-frequency resources supported by the first NAN device; or
determining, by the first NAN device, the first time-frequency resource information and the second time-frequency resource information based on the relay request message according to first service identifier information comprised in the first service information and second service identifier information comprised in the second service information.

5. The method according to claim 4, wherein determining, by the first NAN device, the first time-frequency resource information and the second time-frequency resource information based on the relay request message according to the first service information, and/or the second service information, comprises:
determining, by the first NAN device, the first time-frequency resource information and the second time-frequency resource information based on the relay request message according to first QoS information comprised in the first service information, second QoS information comprised in the second service information, or both.

6. The method according to claim 4, wherein determining, by the first NAN device, the first time-frequency resource information and the second time-frequency resource information based on the relay request message according to at least one of: time-frequency resource information comprised in the first service information, time-frequency resource information comprised in the second service information, or information about time-frequency resources supported by the first NAN device comprises at least one of:
determining, by the first NAN device based on the relay request message;
the first time-frequency resource information according to the time-frequency resource information comprised in the first service information and the information about time-frequency resources supported by the first NAN device, and
the second time-frequency resource information according to the time-frequency resource information comprised in the second service information and the information about time-frequency resources supported by the first NAN device;
determining, by the first NAN device, the first time-frequency resource information and the second time-frequency resource information based on the relay request message according to the time-frequency resource information comprised in the second service information and the information about time-frequency resources supported by the first NAN device;
determining, by the first NAN device, the first time-frequency resource information and the second time-frequency resource information based on the relay request message according to the time-frequency resource information comprised in the first service information and the information about time-frequency resources supported by the first NAN device; or
determining, by the first NAN device, the first time-frequency resource information and the second time-frequency resource information based on the relay request message according to the time-frequency resource information comprised in the first service information and the time-frequency resource information comprised in the second service information.

7. A first neighbor awareness networking (NAN) device, comprising:
a receiving unit, configured to receive a relay request message sent by a second NAN device, wherein the relay request message is configured to request the first NAN device to establish a NAN data link that uses the first NAN device as a relay between the second NAN device and a third NAN device; and a processing unit, configured to:
- determine first time-frequency resource information and second time-frequency resource information according to the relay request message, wherein the first and second time-frequency resource information each indicates resources including a time period and one or more channels;
- establish, with the second NAN device, a first NDL that uses the resources indicated in the first time-frequency resource information based on the relay request message; and
- establish, with the third NAN device, a second NDL that uses the resources indicated in the second time-frequency resource information based on the relay request message, wherein first and second NDL form the NDL between the second and third NAN devices with the first NAN device as the relay; and, wherein the first NAN device, the second NAN device, and the third NAN device communicate with each other based on Wi-Fi.

8. The first NAN device according to claim 7, wherein determining, by the processing unit, the first time-frequency resource information and the second time-frequency resource information according to the relay request message comprises at least one of:
- obtaining, according to the relay request message, time-frequency resource information sent by the second NAN device, and determining the first time-frequency resource information and the second time-frequency resource information according to the time-frequency resource information sent by the second NAN device;
- obtaining, according to the relay request message, time-frequency resource information from the third NAN device, and determining the first time-frequency resource information and the second time-frequency resource information according to the time-frequency resource information sent by the third NAN device; or
- obtaining time-frequency resource information from the second NAN device and time-frequency resource information from the third NAN device; or
- using the time-frequency resource information obtained from the second NAN device as the first time-frequency resource information, and using the time-frequency resource information obtained from the third NAN device as the second time-frequency resource information.

9. The first NAN device according to claim 8, wherein the receiving unit is further configured to receive a service registration message sent by the third NAN device, a service discovery message sent by the third NAN device, or a service information notification message sent by the third NAN device; and
- obtaining, by the processing unit, the first service information of the third NAN device comprises at least one of:
- obtaining the first service information from the service registration message;
- obtaining the first service information from the service discovery message;
- obtaining the first service information from the service information notification message; or
- obtaining the first service information of the third NAN device by using an upper-layer application.

10. The first NAN device according to claim 7, wherein the processing unit is further configured to obtain at least one of first service information of the third NAN device, second service information of the second NAN device; and
- determining, by the processing unit, the first time-frequency resource information and the second time-frequency resource information according to the relay request message comprises:
- determining, by the processing unit, the first time-frequency resource information and the second time-frequency resource information based on the relay request message according to the first service information, and/or the second service information.

11. The first NAN device according to claim 7, determining, by the processing unit, the first time-frequency resource information and the second time-frequency resource information based on the relay request message according to the first service information, and/or the second service information comprises at least one of:
- determining, by the processing unit, the first time-frequency resource information and the second time-frequency resource information based on the relay request message according to at least one of: time-frequency resource information comprised in the first service information, time-frequency resource information comprised in the second service information, or information about time-frequency resources supported by the first NAN device; or
- determining, by the processing unit, the first time-frequency resource information and the second time-frequency resource information based on the relay request message according to first service identifier information comprised in the first service information and second service identifier information comprised in the second service information.

12. The first NAN device according to claim 11, wherein determining, by the processing unit, the first time-frequency resource information and the second time-frequency resource information based on the relay request message according to the first service information, and/or the second service information comprises:
- determining, by the processing unit, the first time-frequency resource information and the second time-frequency resource information based on the relay request message according to first QoS information comprised in the first service information, and/or second QoS information comprised in the second service information.

13. The first NAN device according to claim 11, wherein the processing unit determines the first time-frequency resource information and the second time-frequency resource information based on the relay request message according to at least one of: time-frequency resource information comprised in the first service information, time-frequency resource information comprised in the second service information, or information about time-frequency resources supported by the first NAN device comprises:
- determining, by the processing unit, based on the relay request message;
  - the first time-frequency resource information according to the time-frequency resource information comprised in the first service information and the information about time-frequency resources supported by the first NAN device, and the second time-frequency resource information according to the time-frequency resource information comprised in the second service information and the information about time-frequency resources supported by the first NAN device;

determining the first time-frequency resource information and the second time-frequency resource information based on the relay request message according to the time-frequency resource information comprised in the second service information and the information about time-frequency resources supported by the first NAN device;

determining, by the processing unit, the first time-frequency resource information and the second time-frequency resource information based on the relay request message according to the time-frequency resource information comprised in the first service information and the information about time-frequency resources supported by the first NAN device; or determining, by the processing unit, the first time-frequency resource information and the second time-frequency resource information based on the relay request message according to the time-frequency resource information comprised in the first service information and the time-frequency resource information comprised in the second service information.

14. A second neighbor awareness networking (NAN) device, comprising:

a sending unit, configured to send a relay request message to a first NAN device, wherein: the relay request message is configured to request the first NAN device to establish a NAN data link (NDL) that uses the first NAN device as a relay between the second NAN device and a third NAN device, wherein, the NDL comprises a first NDL established between the second NAN device and the first NAN device, wherein first NDL uses resources indicated in first time-frequency information, the resources including a time period and one or more channels; and a second NDL established between a third NAN device and the first NAN device, wherein second NDL uses resources indicated in second time-frequency information, the resources including a time period and one or more channels; and a processing unit, configured to determine first time-frequency resource information;

wherein the processing unit is further configured to establish, with the first NAN device, the first NDL that uses the first time-frequency resource information.

15. The second NAN device according to claim 14, wherein the second NAN device further comprises a receiving unit, configured to receive time-frequency resource information sent by the first NAN device; and determining, by the processing unit, the first time-frequency resource information comprises:

the processing unit determines the first time-frequency resource information; or uses the time-frequency resource information that is sent by the first NAN device and received by the receiving unit as the first time-frequency resource information.

16. The second NAN device according to claim 15, wherein the processing unit is further configured to obtain third service information of the third NAN device, and/or second service information of the second NAN device; and determining, by the processing unit, the first time-frequency resource information comprises:

determining, by the processing unit, the first time-frequency resource information according to the third service information, and/or the second service information.

17. The second NAN device according to claim 16, wherein determining, by the processing unit, the first time-frequency resource information according to the third service information, the second service information, or both comprises at least one of:

determining, by the processing unit, the first time-frequency resource information according to at least one of: time-frequency resource information comprised in the third service information, time-frequency resource information comprised in the second service information, or information about time-frequency resources supported by the first NAN device; or determining, by the processing unit, the first time-frequency resource information according to first service identifier information comprised in the third service information and second service identifier information comprised in the second service information.

18. The second NAN device according to claim 17, wherein determining, by the processing unit, the first time-frequency resource information according to at least one of: time-frequency resource information comprised in the third service information, time-frequency resource information comprised in the second service information, or information about time-frequency resources supported by the first NAN device comprises at least one of:

determining, by the processing unit, the first time-frequency resource information according to the time-frequency resource information comprised in the third service information and the information about time-frequency resources supported by the first NAN device;

determining, by the processing unit, the first time-frequency resource information according to the time-frequency resource information comprised in the second service information and the information about time-frequency resources supported by the first NAN device; or determining, by the processing unit, the first time-frequency resource information according to the time-frequency resource information comprised in the third service information and the time-frequency resource information comprised in the second service information.

19. The second NAN device according to claim 16, wherein determining, by the processing unit, the first time-frequency resource information according to the third service information, and/or the second service information comprises:

determining, by the processing unit, the first time-frequency resource information according to first QoS information comprised in the third service information, and/or second QoS information comprised in the second service information.

20. The second NAN device according to claim 14, wherein the processing unit is further configured to determine that the second NAN device cannot connect to the third NAN device; and, wherein that the processing unit determines that the second NAN device cannot connect to the third NAN device comprises:

obtaining the third service information of the third NAN device, sending, by the sending unit, a service discovery message to the third NAN device according to the third service information, and when the receiving unit receives, in preset duration, no service discovery response message sent by the third NAN device, determining, by the processing unit, that the second NAN device cannot connect to the third NAN device; or obtaining the third service information of the third NAN device, sending, by the sending unit, a service link connection request message to the third NAN device according to the third service information, and when the receiving unit receives, in preset duration, no service link connection response message sent by the third NAN device, determining, by the processing unit, that the second NAN device cannot connect to the third NAN device.

* * * * *